(12) United States Patent
Chawla et al.

(10) Patent No.: US 12,067,248 B2
(45) Date of Patent: Aug. 20, 2024

(54) TIERED MEMORY FABRIC WORKLOAD PERFORMANCE OPTIMIZATION SYSTEM

(71) Applicant: Dell Products L.P., Round Rock, TX (US)

(72) Inventors: Gaurav Chawla, Austin, TX (US); John Cardente, Milford, MA (US); John Harwood, Boston, MA (US)

(73) Assignee: Dell Products L.P., Round Rock, TX (US)

( * ) Notice: Subject to any disclaimer, the term of this patent is extended or adjusted under 35 U.S.C. 154(b) by 57 days.

(21) Appl. No.: 18/094,287

(22) Filed: Jan. 6, 2023

(65) Prior Publication Data

US 2024/0231629 A1     Jul. 11, 2024

(51) Int. Cl.
G06F 3/06      (2006.01)

(52) U.S. Cl.
CPC ......... *G06F 3/0613* (2013.01); *G06F 3/0629* (2013.01); *G06F 3/0673* (2013.01)

(58) Field of Classification Search
CPC ..... G06F 3/0613; G06F 3/0629; G06F 3/0673
See application file for complete search history.

(56) References Cited

U.S. PATENT DOCUMENTS

| | | | |
|---|---|---|---|
| 8,595,439 B1 * | 11/2013 | Koh | G06F 8/30 711/123 |
| 10,404,547 B2 | 9/2019 | Bartfai-Walcott et al. | |
| 2021/0208952 A1 * | 7/2021 | Jain | G06F 9/5044 |
| 2021/0303045 A1 * | 9/2021 | Leung | G06F 1/3228 |

* cited by examiner

Primary Examiner — Zhuo H Li
(74) Attorney, Agent, or Firm — Joseph Mencher

(57) ABSTRACT

A tiered memory fabric workload performance optimization system includes a workload management device coupled to a processing fabric and a memory fabric. The workload management system receives a workload request to perform a workload including sub-workloads, and identifies a respective processing system in the processing fabric for performing each of the sub-workloads. The workload management device then determines, for use by each respective processing system identified for performing the sub-workloads, a respective memory system in the memory fabric to provide memory systems in different memory tiers in the memory fabric that optimize characteristic(s) of a workload performance pipeline provided by the respective processing systems identified for performing the sub-workloads. The workload management device then configures each respective processing system identified for performing each of the sub-workloads, and the respective first memory system determined for that respective processing system, to perform the sub-workload that respective processing system was identified to perform.

20 Claims, 16 Drawing Sheets

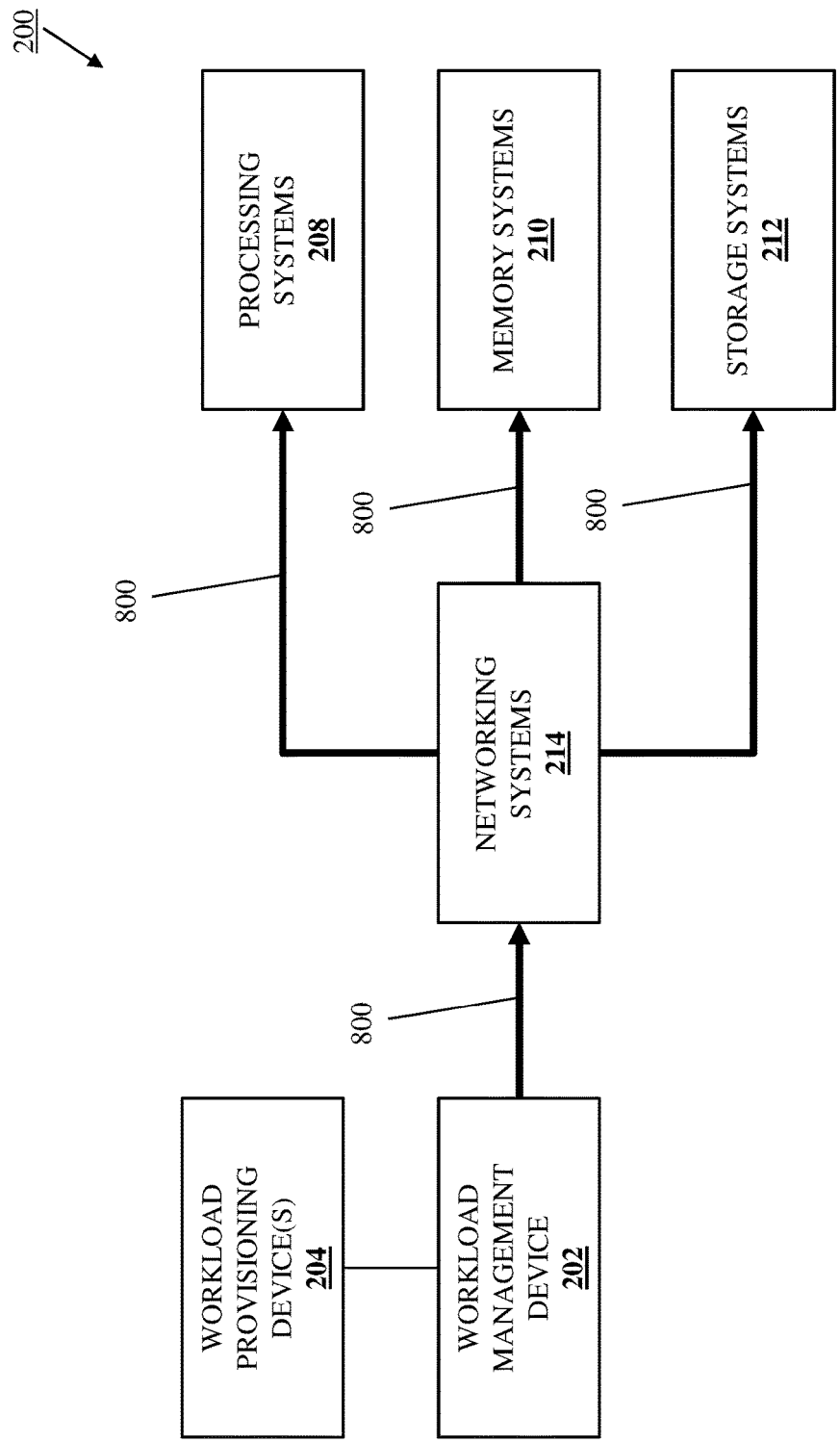

//* TIERED MEMORY FABRIC WORKLOAD PERFORMANCE OPTIMIZATION SYSTEM

BACKGROUND

The present disclosure relates generally to information handling systems, and more particularly to optimizing workload performance by information handling systems using a tiered memory fabric.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as server devices, desktop computing devices, laptop/notebook computing devices, tablet computing devices, mobile phones, and/or other computing devices often require the performance of workloads. Conventional workload performance systems perform workloads using a single processing system (e.g., a Central Processing Unit (CPU) processing system such as a x86 processing system) connected to its local memory system (e.g., a Dynamic Random Access Memory (DRAM) system) and a local storage system (e.g., a Hard Disk Drive (HDD) storage system). However, workload performance systems have begun transition to performing workloads on a plurality of heterogeneous processing systems coupled to a pool of memory systems, and the inventors of the present disclosure have recognized that conventional workload performance optimization techniques utilized with the static (i.e., hard-wired) connectivity of processing systems to memory systems in the conventional workload performance systems discussed above simply will not provide for the optimization of workload performance on a plurality of heterogeneous processing systems connected to a pool of memory systems, as the performance of any particular workload includes different requirements and in different levels of utilization across multiple processing systems and memory systems.

Accordingly, it would be desirable to provide a workload performance optimization system that addresses the issues discussed above.

SUMMARY

According to one embodiment, an Information Handling System (IHS) includes a workload management processing system; and a workload management memory system that is coupled to the workload management processing system and that includes instructions that, when executed by the workload management processing system, cause the workload management processing system to provide a workload management engine that is configured to: receive a workload request to perform a workload including a plurality of sub-workloads; identify a respective fabric processing system in a processing fabric for performing each of the plurality of sub-workloads; determine, for use by each respective fabric processing system identified for performing each of the plurality of sub-workloads, a respective first fabric memory system in a memory fabric to provide a plurality of respective first fabric memory systems in different memory tiers in the memory fabric that optimize at least one first workload performance pipeline characteristic of a workload performance pipeline provided by the respective fabric processing systems identified for performing the plurality of sub-workloads; and configure each respective fabric processing system identified for performing each of the plurality of sub-workloads, and the respective first fabric memory system determined for that respective fabric processing system, to perform the sub-workload that respective fabric processing system was identified to perform.

BRIEF DESCRIPTION OF THE DRAWINGS

FIG. 8B is a schematic view illustrating an embodiment of the tiered memory fabric workload performance optimization system of FIG. 2 operating during the method of FIG. 4.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
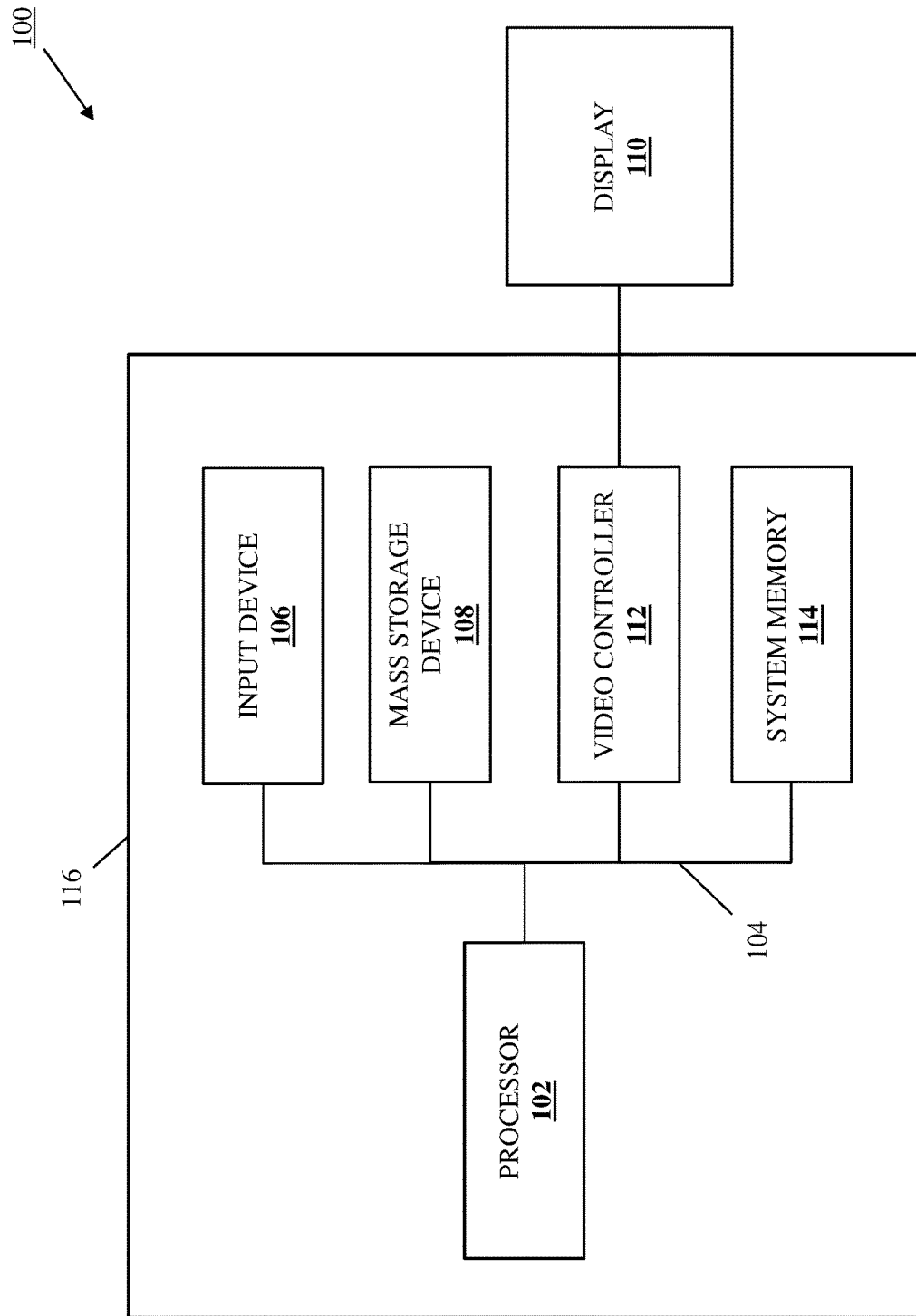
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
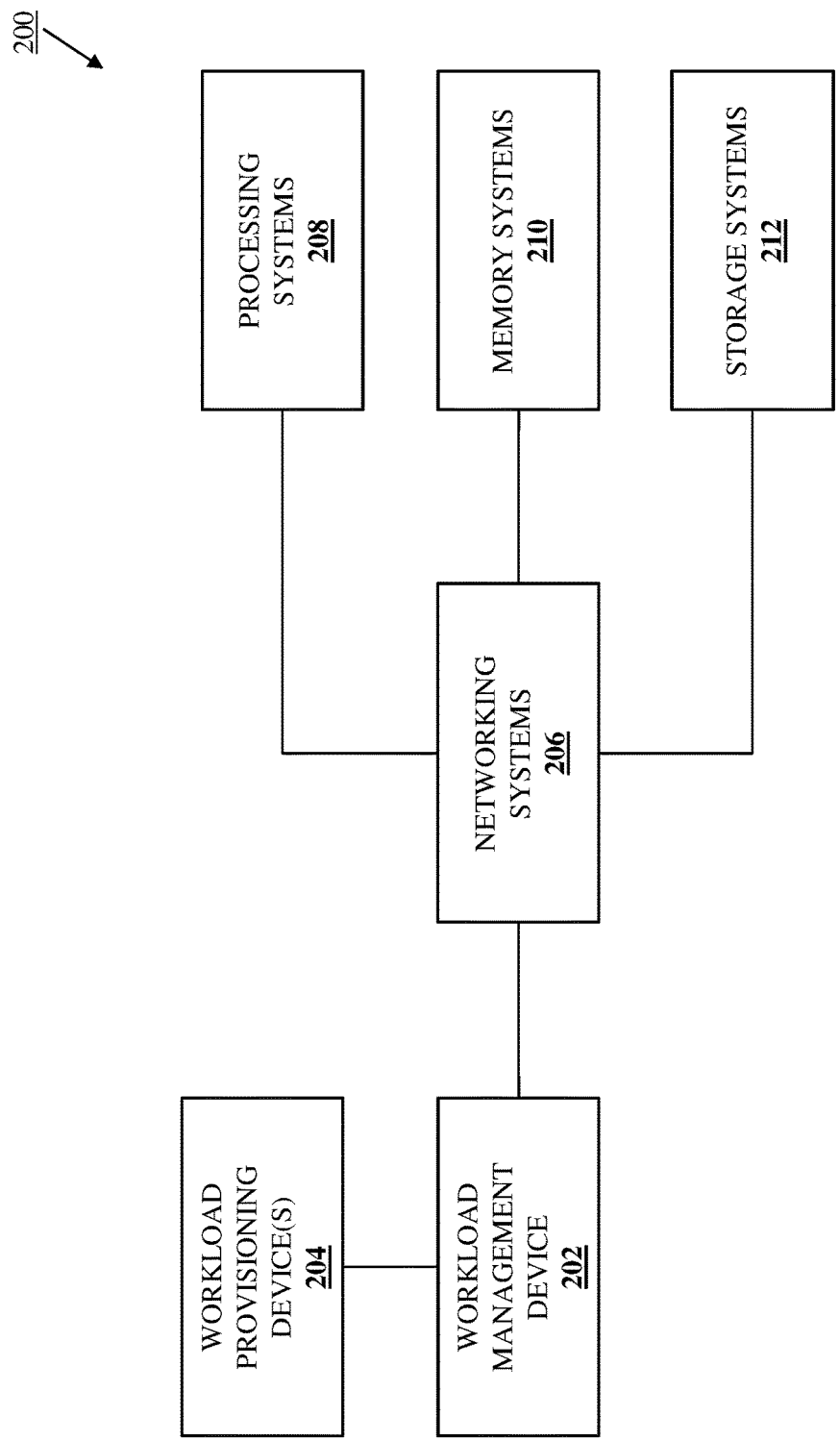
FIG. 2 is a schematic view illustrating an embodiment of a tiered memory fabric workload performance optimization system.

Referring now to FIG. 2, an embodiment of a tiered memory fabric workload performance optimization system 200 is illustrated that may be provided according to the teachings of the present disclosure. In the illustrated embodiment, the tiered memory fabric workload performance optimization system 200 includes a workload management device 202 that may operate to perform the workload management functionality described below. In an embodiment, the workload management device 202 may be provided by the IHS 100 discussed above with reference to FIG. 1, and/or may include some or all of the components of the IHS 100, and in specific examples may be provided by a server device. However, while illustrated and discussed as being provided by a server device, one of skill in the art in possession of the present disclosure will recognize that workload management devices provided in the tiered memory fabric workload performance optimization system 200 may include any devices that may be configured to operate similarly as the workload management device 202 discussed below.

In the illustrated embodiment, the tiered memory fabric workload performance optimization system 200 includes one or more workload provisioning devices 204 that are coupled to the workload management device 202, and while the workload provisioning device(s) 204 are illustrated as being directly coupled to the workload management device 202, one of skill in the art in possession of the present disclosure will appreciate how the workload provisioning device(s) 204 may be coupled to the workload management device 202 via a network (e.g., a Local Area Network (LAN), the Internet, combinations thereof, and/or other networks known in the art) while remaining within the scope of the present disclosure as well. In an embodiment, the workload provisioning device(s) 204 may be provided by the IHS 100 discussed above with reference to FIG. 1, and/or may include some or all of the components of the IHS 100, and in specific examples may be provided by server devices, desktop computing devices, laptop/notebook computing devices, tablet computing devices, mobile phones, and/or other computing devices that one of skill in the art in possession of the present disclosure would appreciate are configured to request the performance of the workloads discussed below. However, while illustrated and discussed as being provided by particular computing devices, one of skill in the art in possession of the present disclosure will recognize that workload provisioning devices provided in the tiered memory fabric workload performance optimization system 200 may include any devices that may be configured to operate similarly as the workload provisioning device(s) 204 discussed below.

In the illustrated embodiment, the workload management device 202 is coupled to a plurality of networking systems 206 that provides a network including a processing fabric, a memory fabric, and a storage fabric, and one of skill in the art in possession of the present disclosure will appreciate how that network may be provided using a LAN, the Internet, combinations thereof, and/or any of a variety of networks that one of skill in the art in possession of the present disclosure will recognize as allowing the functionality described below. For example, the networking systems 206 may include Ethernet networking systems, Infiniband networking systems, Compute eXpress Link (CXL) networking systems, NVLink networking systems, 5G networking systems, satellite networking systems, and/or other networking systems that would be apparent to one of skill in the art in possession of the present disclosure. As discussed below, the processing fabric, memory fabric, and storage fabric may provide a variety of resources connected to each other in a variety of manners across a variety of locations in a manner that allow the distributed performance of the workloads described below.

For example, the workload management device 202 may be coupled via the networking systems 206 to a processing fabric that, in the examples illustrated and discussed below, is provided by a plurality of processing systems 208 that may be included in server devices or other computing systems known in the art, and that may be provided by homogenous or heterogenous processor technologies. As described below, the processing systems 208 that provide the processing fabric may be provided by different types of processing systems such as Central Processing Unit (CPU) processing systems (e.g., x86 CPU processing systems, ARM CPU processing systems, etc.), Graphics Processing Unit (GPU) processing systems, Field Programmable Gate Array (FPGA) processing systems, Data Processing Unit (DPU) processing systems, Network Interface Controller (NIC) processing systems or other packet processors, Application Specific Integrated Circuit (ASIC) processing systems (e.g., hardware accelerator ASIC processing systems), other hardware accelerator processing systems, and/or other types of processing systems that one of skill in the art in possession of the present disclosure would appreciate may be utilized to perform workloads.

As such, resource capabilities provided by the processing systems 208 in the processing fabric may include capabilities provided by different types of processing systems, and as discussed in some of the specific examples provided below, resource capabilities provided by the processing systems 208 may include the capability of the processing systems 208 to perform one or more sub-workloads such as, for example, microservice(s) that those processing resources are configured to perform, and/or other sub-workloads that would be apparent to one of skill in the art in possession of the present disclosure. Furthermore, while sub-workload capabilities are described, one of skill in the art in possession of the present disclosure will appreciate how processing speed, processing bandwidth, different processing functionality (e.g., encryption/decryption, compression/decompression, etc.), and/or other capabilities will fall within the scope of the present disclosure as well.

The workload management device 202 may also be coupled via the networking systems 206 to a memory fabric that, in the examples illustrated and discussed below, is provided by a plurality of memory systems 210 that may be included in server devices or other computing systems known in the art, and that may be provided by homogenous or heterogenous memory technologies. As described below, the memory systems 210 that provide the memory fabric may be provided by different types of memory systems such as CPU-accessible memory systems, GPU-accessible memory systems, FPGA-accessible memory systems, DPU-accessible memory systems, NIC-accessible memory systems or other packet-processor-accessible memory systems, ASIC-accessible memory systems, computational memory systems, other hardware-accelerator-accessible memory systems, and/or other types of memory systems that would be apparent to one of skill in the art in possession of the present disclosure would appreciate may be utilized by processing systems to perform workloads. To provide some specific examples, the memory systems 210 may include Dynamic Random Access Memory (DRAM) systems, Physical MEMory (PMEM) systems, CXL-attached PMEM systems, CXL-attached Non-Volatile Memory express (NVMe) PMEM systems, CXL-attached flash memory systems, NVMe over Fabric (NVME-oF) attached flash memory systems, and/or any other memory systems that would be apparent to one of skill in the art in possession of the present disclosure.

As discussed below, the memory systems 210 may be configured to provide a distributed tiered memory fabric that provides a pool of memory resources for use by the processing systems 208 in performing workloads. In some embodiments, each memory system 210 may appear as a "local" memory system to each of the processing systems 208, with memory system access enabled via Remote Direct Memory Access (RDMA) operations, direct access operations (where available), and/or other memory system access techniques that would be apparent to one of skill in the art in possession of the present disclosure. Furthermore, the memory systems 210 may be "tiered" or otherwise separated based on their performance capabilities (e.g., memory bandwidth, memory speed, memory persistence, memory latency, memory caching, memory durability, memory capacity, memory endurance, and/or any other memory capabilities of memory resources known in the art) into a highest performance memory tier, a lowest performance memory tier, and one or more intermediate performance memory tiers. As such, one of skill in the art in possession of the present disclosure will appreciate how any number of memory tiers may be defined based on any of a variety of memory system performance capabilities, with each of the memory systems 210 included in one of those memory tiers. Furthermore, in some examples, the performance of those memory systems 210 may be monitored, and those memory systems may be moved based on that monitoring to different memory tiers.

As such, any of the memory systems 210 may be "proximate" to any of the processing systems 208 based on, for example, the processing of data stored in that memory system by its proximate processing system being relatively more efficient than the processing of that data stored in that memory system by the other processing systems due to, for example, that proximity resulting in relatively faster access to that data that in turn allows relatively faster processing of that data and/or faster transfers of that data over a network (e.g., with a time needed to access and/or transfer data measured in terms of the time required to receive the first byte of data, the last byte of data, and/or using other data access time measurement techniques that one of skill in the art in possession of the present disclosure would recognize as taking into account data access delays cause by the number of network segments traversed, network bandwidth, network physical media, network protocols, network contention, network reliability, and/or other data access delays known in the art), and/or based on any other memory system/processing system proximity factors that would be apparent to one of skill in the art in possession of the present disclosure.

In a specific example, "proximity" between a memory system and a processing system may be defined in terms of network latency that may be measured based on "hops", network fabric type, and/or using other latency metrics that would be apparent to one of skill in the art in possession of the present disclosure. For example, the number of hops in a topology between a memory system and a processing system may be limited to a threshold number of hops in order to be "proximate". In another example, "proximity" may be defined by the enablement of relatively higher performance networking between a memory system and a processing system (e.g., relatively higher speed CXL networking systems vs. relatively lower speed Ethernet networking systems), with the memory system or other "data landing zone" transformed in some embodiments into a memory space to enable memory-to-memory data transfers for peer-to-peer communications (e.g., while eliminating an external network).

The workload management device 202 may also be coupled via the networking systems 206 to a storage fabric that, in the examples illustrated and discussed below, is provided by a plurality of storage systems 212. As described below, the storage systems 212 that provide the storage fabric may be provided by different types of storage systems such as CPU-accessible storage systems, GPU-accessible storage systems, FPGA-accessible storage systems, DPU-accessible storage systems, NIC-accessible storage systems or other packet-processor-accessible storage systems, ASIC-accessible storage systems, other hardware-accelerator-accessible storage systems, and/or other types of storage systems that would be apparent to one of skill in the art in possession of the present disclosure would appreciate may be utilized by processing systems to perform workloads. Furthermore, one of skill in the art in possession of the present disclosure will appreciate how the storage systems 212 may provide one or more of the memory systems 210 such as, for example, network-attached PMEM systems, network-attached flash memory systems, NVMe-oF attached flash memory systems, and/or any other storage-system-based memory systems that would be apparent to one of skill in the art in possession of the present disclosure.

As such, resource capabilities provided by the storage systems 212 may include capabilities provided by different types of storage systems, and the resource capabilities provided by the storage systems 212 may be identified by storage tiers in which each storage resource is included (e.g., a relatively high performance storage tier, at least one intermediate storage tier, and a relatively low performance storage tier) and which may be defined by particular storage capabilities provided by the storage systems 212 included therein such as storage bandwidth, storage speed, and/or any other storage capabilities of storage resources known in the art.

Furthermore, resource capabilities provided by the connectivity between the processing systems 208 and the memory systems 210 may be based on processing system/memory system direct connections and/or couplings via a physical networking fabric that provide the data communication path(s) between any pair of a processing systems and memory system. As such, resource capabilities of the processing system/memory system connectivity discussed below may identify how each of the processing systems 208 and memory systems 210 are connected and/or coupled together, may include information about the proximity of the processing systems 208 and memory systems 210 (e.g., by indicating the memory systems 210 that are directly connected to processing systems 208 as opposed to memory systems 210 that are coupled to processing systems 208 by one or more components and/or a network, indicating the memory systems 210 that are coupled to processing systems 208 by relatively high speed networking components, etc.). Furthermore, resource capabilities provided by the connectivity between the processing systems 208 and the memory systems 210 may include the latency of such connectivity, the bandwidth of such connectivity, and/or any other connectivity capabilities that would be apparent to one of skill in the art in possession of the present disclosure.

As discussed above, the memory systems 210 may be configured as a shared memory fabric that allows each of the memory systems 210 to be accessible by each of the processing systems 208 via Remote Direct Memory Access (RDMA) operations or other remote access techniques known in the art, and thus each memory system may appear as a "local" memory resource (e.g., a directly-connected memory resource) to that processing system regardless of the physical proximity of that memory system to that processing system. As such, while each processing system 208 may be configured to access data in any of the memory systems 210 via RDMA operations in a manner similar to accessing data in local/directly connected memory systems, the resource capabilities determined for the connectivity between processing systems and memory system may identify the relative "proximity" of processing/memory system combinations and/or may otherwise identify the relative efficiency of processing system/memory system combinations.

As discussed above, processing systems and memory systems in a variety of different locations may be connected to each other in a variety of manners, and because the processing fabric/memory fabric interconnect may influence the behavior of memory systems and memory tiers in a non-deterministic manner, knowledge of the resource capabilities of the connectivity between processing systems and memory systems will allow for a determination of the capability of any processing system/memory system combination to meet the requirements of a workload. However, while a specific tiered memory fabric workload performance optimization system 200 has been illustrated and described, one of skill in the art in possession of the present disclosure will appreciate how the tiered memory fabric workload performance optimization system of the present disclosure may include a variety of components and/or component configurations while remaining within the scope of the present disclosure as well.

Figure 3:
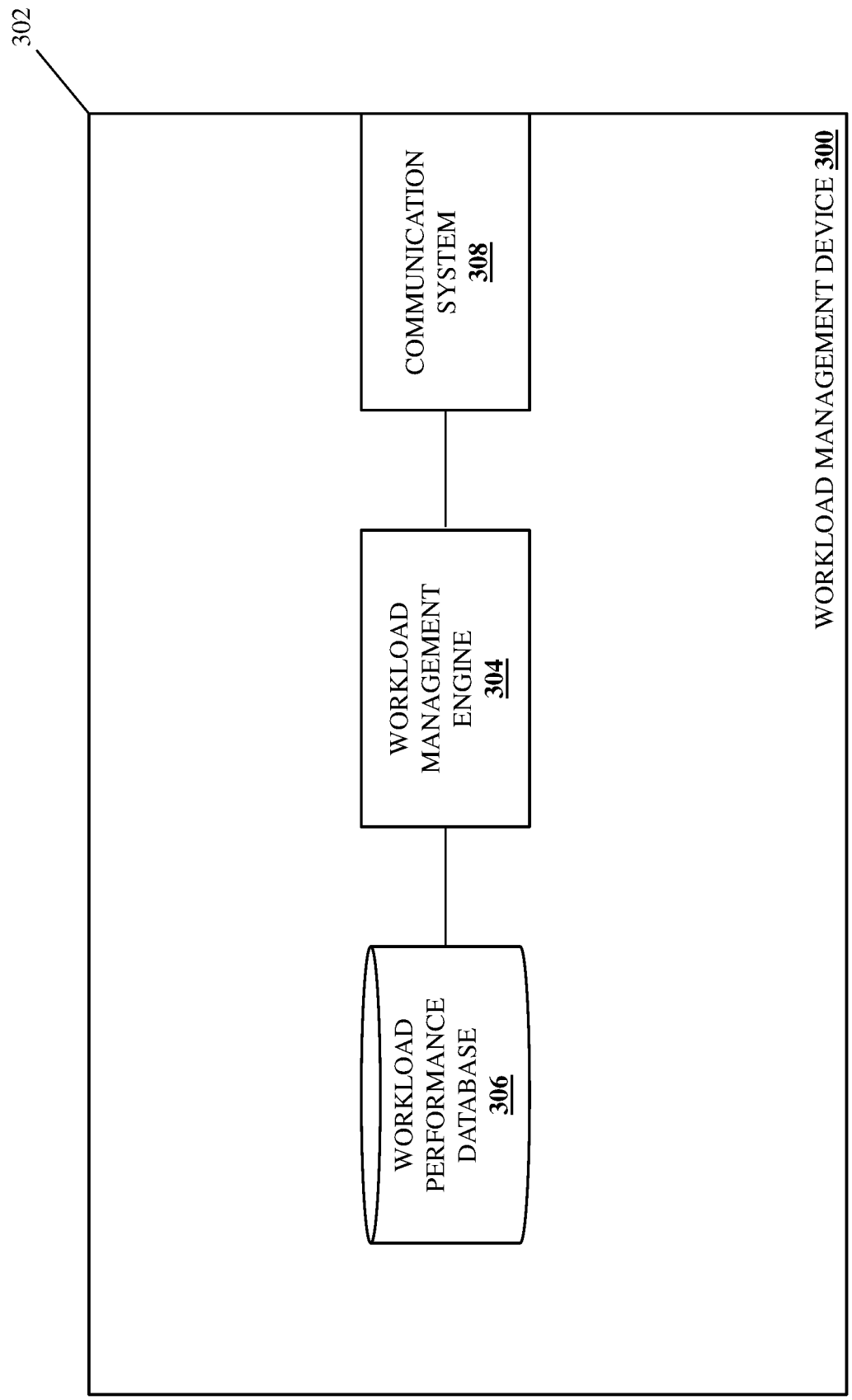
FIG. 3 is a schematic view illustrating an embodiment of a workload management device that may be included in the tiered memory fabric workload performance optimization system of FIG. 2.

Referring now to FIG. 3, an embodiment of a workload management device 300 is illustrated that may provide the workload management device 202 discussed above with reference to FIG. 2. As such, the workload management device 300 may be provided by the IHS 100 discussed above with reference to FIG. 1 and/or may include some or all of the components of the IHS 100, and in specific examples may be provided by a service device. Furthermore, while illustrated and discussed as being provided by a server device, one of skill in the art in possession of the present disclosure will recognize that the functionality of the workload management device 300 discussed below may be provided by other devices that are configured to operate similarly as the workload management device 202 discussed below. In the illustrated embodiment, the workload management device 300 includes a chassis 302 that houses the components of the workload management device 300, only some of which are illustrated and discussed below.

For example, the chassis 302 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a workload management engine 304 that is configured to perform the functionality of the workload management engines and/or workload management devices discussed below. In some of the specific examples provided below, the memory system includes instructions that, when executed by the processing system, cause the processing system to provide a resource monitoring sub-engine, a resource configuration sub-engine, a resource allocation sub-engine, and a workload deployment sub-engine that are each included in workload management engine 304 and that are each configured to perform the functionality of the resource monitoring sub-engines, resource configuration sub-engines, resource allocation sub-engines, workload deployment sub-engines, and/or workload management devices discussed below.

The chassis 302 may also house a storage system (not illustrated, but which may include the storage 108 discussed above with reference to FIG. 1) that is coupled to the workload management engine 304 (e.g., via a coupling between the storage system and the processing system) and that includes a workload performance database 306 that is configured to store any of the information utilized by the workload management engine 304 discussed below. The chassis 302 may also house a communication system 308 that is coupled to the workload management engine 304 (e.g., via a coupling between the communication system 308 and the processing system) and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure. However, while a specific workload management device 300 has been illustrated and described, one of skill in the art in possession of the present disclosure will recognize that workload management devices (or other devices operating according to the teachings of the present disclosure in a manner similar to that described below for the workload management device 300) may include a variety of components and/or component configurations for providing conventional functionality, as well as the functionality discussed below, while remaining within the scope of the present disclosure as well.

Figure 4:
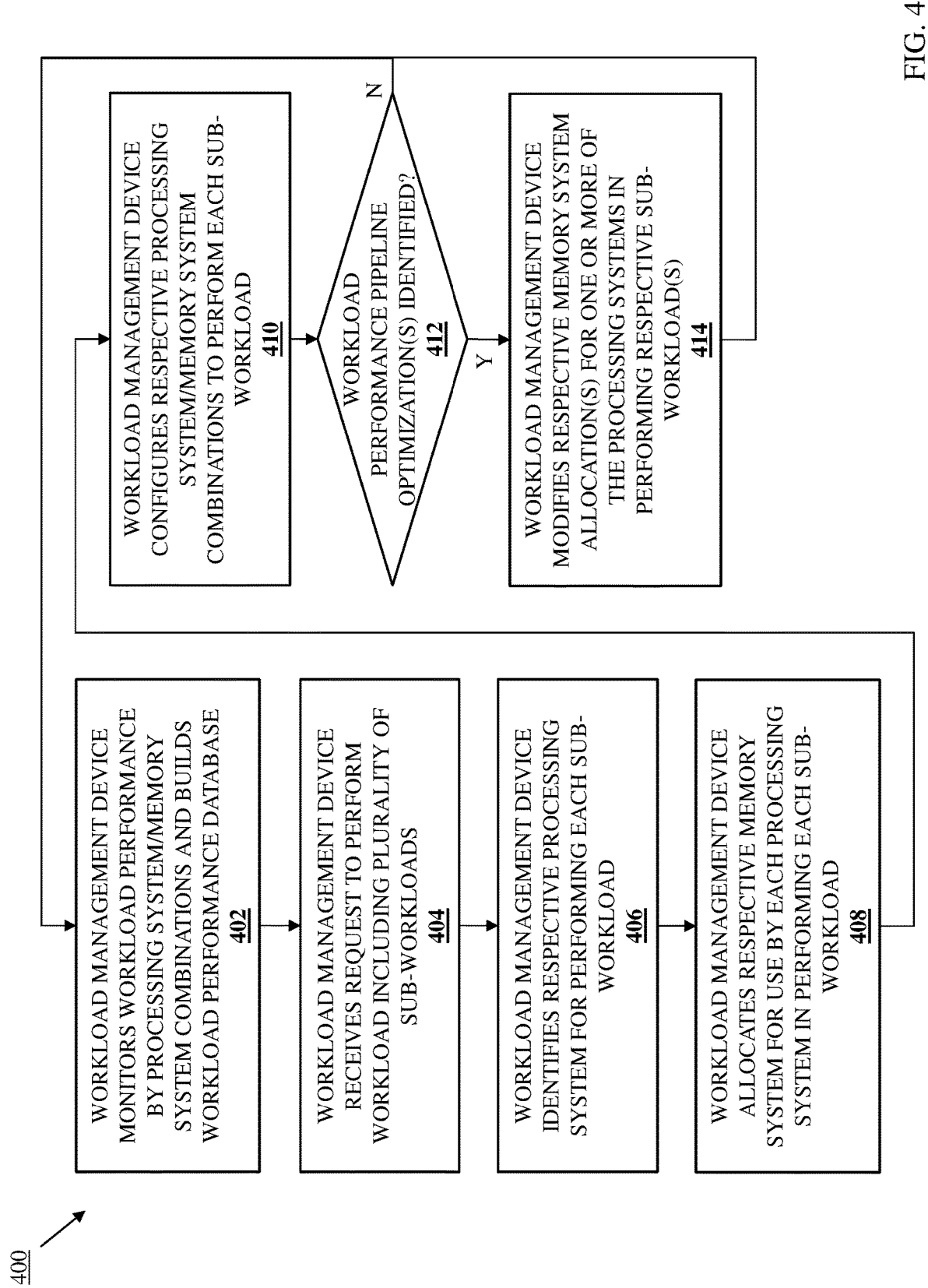
FIG. 4 is a flow chart illustrating an embodiment of a method for optimizing the performance of workloads using a tiered memory fabric.

Referring now to FIG. 4, an embodiment of a method 400 for optimizing the performance of workloads using a tiered memory fabric is illustrated. As discussed below, the systems and methods of the present disclosure allocate a plurality of memory systems in different memory tiers of a distributed tiered memory fabric for use by respective processing systems in performing workloads in a manner that optimizes a workload performance pipeline provided by those processing systems. For example, the tiered memory fabric workload performance optimization system may include a workload management device coupled to a processing fabric and a memory fabric. The workload management system receives a workload request to perform a workload including sub-workloads, and identifies a respective processing system in the processing fabric for performing each of the sub-workloads. The workload management device then determines, for use by each respective processing system identified for performing the sub-workloads, a respective memory system in the memory fabric to provide memory systems in different memory tiers in the memory fabric that optimize characteristic(s) of a workload performance pipeline provided by the respective processing systems identified for performing the sub-workloads. The workload management device then configures each respective processing system identified for performing each of the sub-workloads, and the respective first memory system determined for that respective processing system, to perform the sub-workload that respective processing system was identified to perform.

As discussed above, in a distributed system with different processing systems and memory systems in different memory tiers, any workload may be performed using different processing system/memory system combinations, with the workload performance and resource utilization efficiency benefitting from "optimized" allocations of particular memory tier memory systems to particular processing systems to ensure that workload SLAs are satisfied without wasting resources or performing inefficient resource allocations (e.g., by allocating a relatively high cost memory system for a workload or sub-workload that does not require it). As such, an understanding of how processing systems utilize different memory tier memory systems to perform workloads allows those workloads to be deployed intelligently across processing systems using different memory tier memory systems to improve the performance of workloads relative to conventional workload performance systems with regard to both satisfying workload requirements while efficiently using resources.

Figure 5A:
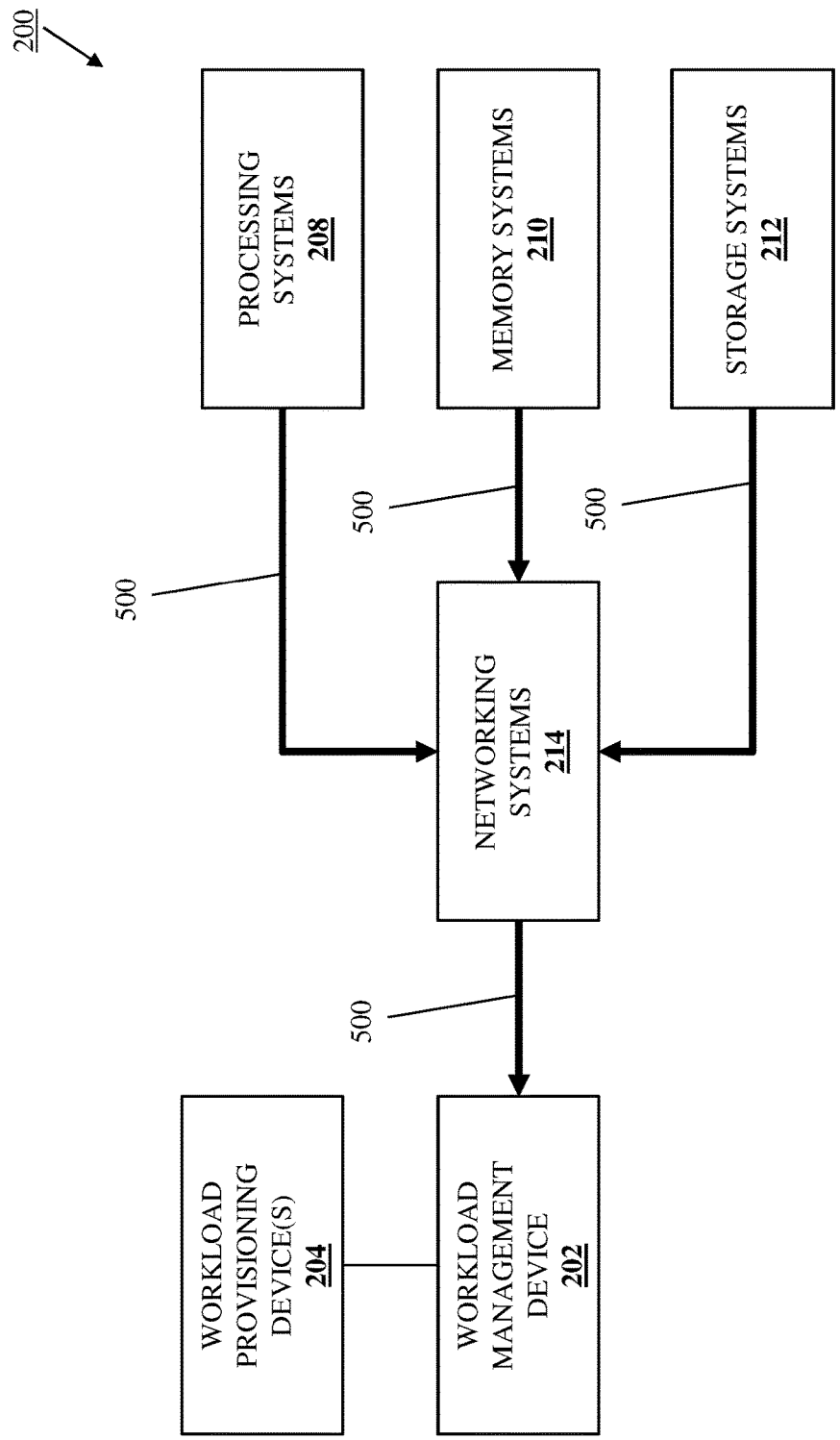
FIG. 5A is a schematic view illustrating an embodiment of the tiered memory fabric workload performance optimization system of FIG. 2 operating during the method of FIG. 4.
Figure 5B:
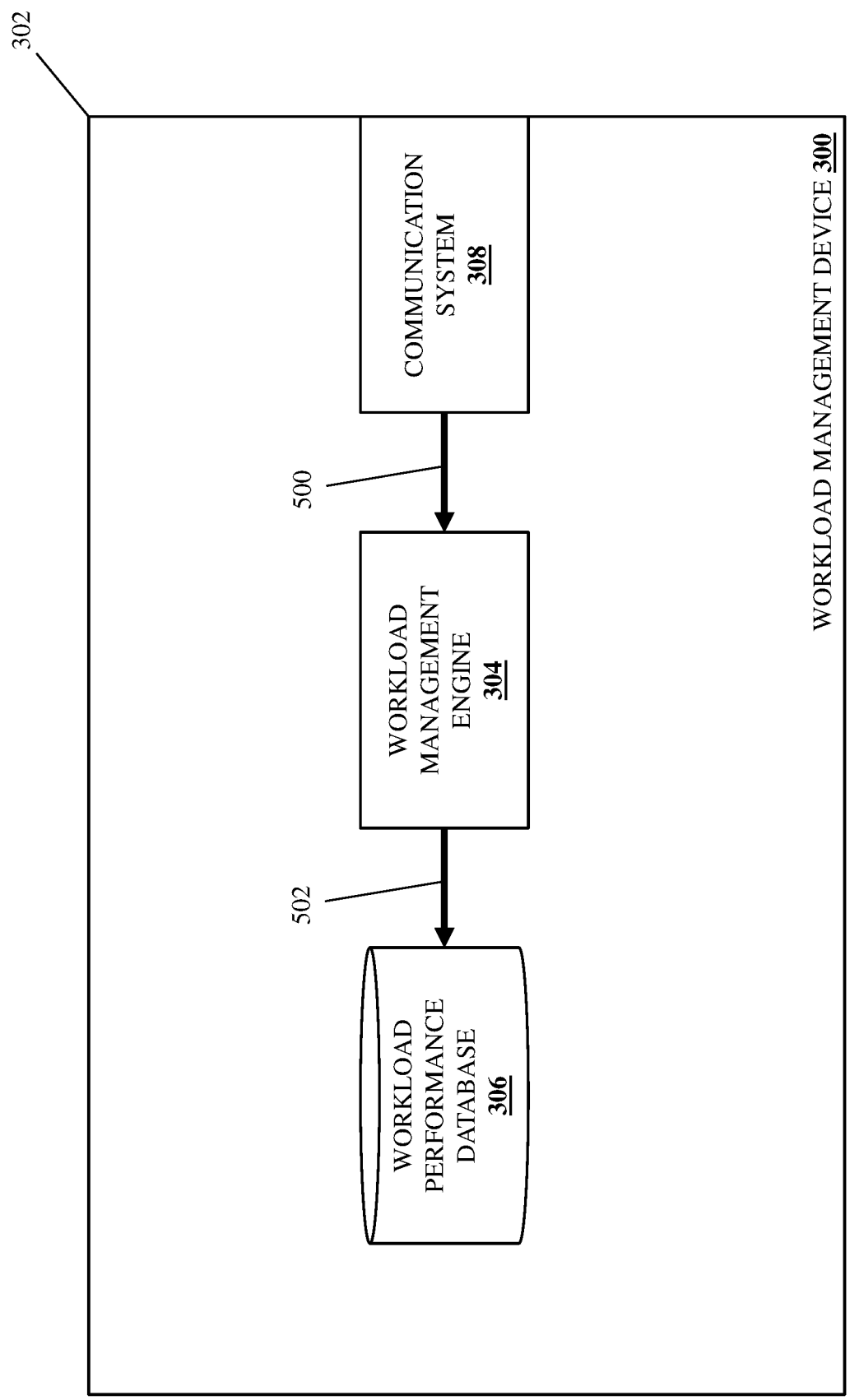
FIG. 5B is a schematic view illustrating an embodiment of the workload management device of FIG. 3 operating during the method of FIG. 4.

The method 400 begins at block 402 where a workload management device monitors workload performance by processing system/memory system combinations and builds a workload performance database. With reference to FIGS. 5A and 5B, in an embodiment of block 402, the resource monitoring sub-engine in the workload management engine 304 in the workload management device 202/300 may perform workload performance monitoring operations 500 that may include monitoring, via its communication system 308, the performance of workloads using the processing systems 208 and the memory systems 210. Furthermore, while not described in detail below, the workload performance monitoring operations 500 may also include monitoring the performance of workloads using the storage systems 212 at block 402 as well.

As discussed in detail below, the method 400 may provide for the identification of a plurality of the processing systems 208 for performing sub-workloads included in any particular workload, and the determination of a respective memory system 210 for use by each of those processing systems in performing those sub-workloads. As such, one of skill in the art in possession of the present disclosure will appreciate how the performance of sub-workloads in a workload by any processing system/memory system combination may be monitored at block 402 to identify sub-workload performance characteristics of that processing system/memory system combination when performing that sub-workload by itself, workload performance characteristics of that processing system/memory system combination in performing that sub-workload as part of the workload, as well as any other workload/sub-workload performance information that would be apparent to one of skill in the art in possession of the present disclosure.

To provide a specific example, and as discussed in further detail below, a GPU processing system may be identified for performing a first sub-workload in a workload, and a CXL-attached PEM system may be determined for use by that GPU processing system in performing that first sub-workload to provide a first processing system/memory system combination for performing the first sub-workload. Furthermore, a plurality of other processing system/memory system combinations for performing other sub-workloads in that workload may be identified/determined in a similar manner. The monitoring at block 402 may then identify sub-workload performance characteristics of the first processing system/memory system combination (i.e., the GPU processing system/CXL-attached PEM system) in performing the first sub-workload that may include a variety of utilization information generated by the GPU processing system in performing the first sub-workload, a variety of utilization information generated by the CXL-attached PEM system in performing the first sub-workload, a variety of utilization information generated by the GPU processing system and the CXL-attached PEM system when communicating with each other (e.g., directly, via the network 206, etc.) while performing the first sub-workload, and/or any other sub-workload performance characteristics that would be apparent to one of skill in the art in possession of the present disclosure.

The monitoring at block 402 may also identify workload performance characteristics of the first processing system/memory system combination (i.e., the GPU processing system/CXL-attached PEM system) in performing the first sub-workload as part of the workload that may include a variety of utilization information generated by the GPU processing system when communicating (as part of performing the first sub-workload) with the other processing systems and/or memory systems performing the other sub-workloads, a variety of utilization information generated by the CXL-attached PEM system when communicating (as part of performing the first sub-workload) with the other processing systems and/or memory systems performing the other sub-workloads, and/or any other workload performance characteristics that would be apparent to one of skill in the art in possession of the present disclosure.

As such, for any sub-workload performed by a processing system/memory system combination, the monitoring at block 402 may identify how much processing system bandwidth of the processing system was utilized, how much memory system bandwidth of the memory system was utilized, processing systems latencies introduced by the processing system, memory system latencies introduced by the memory system, an amount of memory system capacity utilized, whether Service Level Agreement (SLA) metrics (e.g., response times, minimum transaction counts, etc.) associated with workloads or sub-workloads were not met, met, or exceeded, as well as any other information that one of skill in the art in possession of the present disclosure would recognize as providing for the functionality described below. With reference back to FIG. 5B, the resource monitoring sub-engine in the workload management engine 304 may then perform workload performance information storage operations 502 that include storing the workload performance information monitored at block 402 in the workload performance database 306. As will be appreciated by one of skill in the art in possession of the present disclosure, while the workload performance determination operations 500 and the workload performance information storage operations 502 are illustrated and described as being performed once during each iteration of the method 400 at block 402, the workload performance information discussed above may be determined periodically and at any time during the method 400 while remaining within the scope of the present disclosure as well.

As such, following block 402 after one or more iterations of the method 400, the workload performance database 306 may store "historical" processing system/memory system workload performance data and/or other information collected for the previous performance of any sub-workload included in any of a variety of different workloads by one or more processing system/memory system combinations, which as discussed below provides a "knowledge base" of workload/sub-workload performance by different processing system/memory system combinations and configurations, and may be used to identify a processing system/memory system combination and configuration for any sub-workload included in a workload that is requested for performance during the method 400 as discussed below. Furthermore, the monitoring of the performance of sub-workloads included in any workload may be used to modify the historical fabric processing system/fabric memory system workload performance data/information associated with those sub-workloads, workloads, processing systems, and/or memory systems.

Figure 6A:
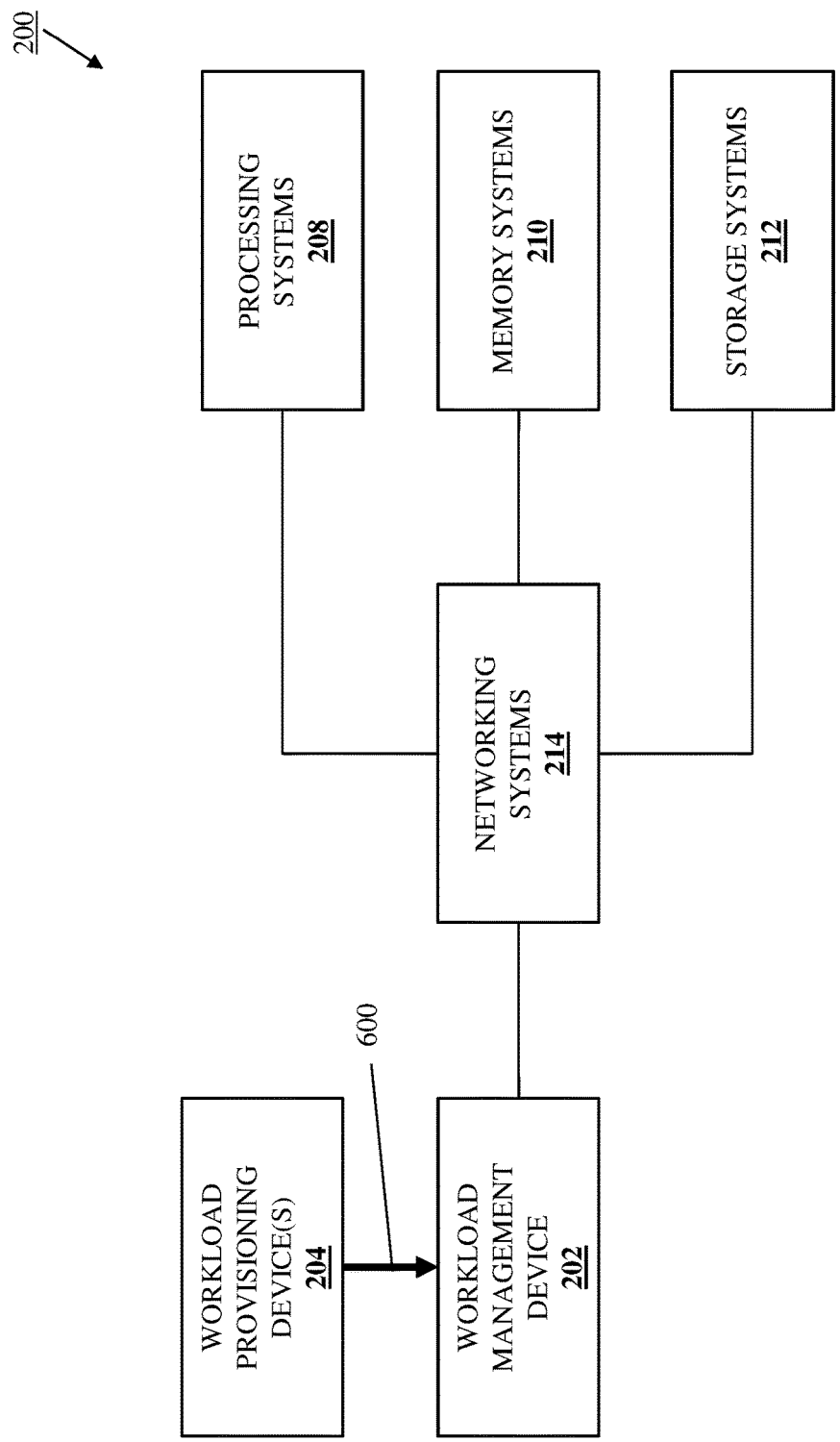
FIG. 6A is a schematic view illustrating an embodiment of the tiered memory fabric workload performance optimization system of FIG. 2 operating during the method of FIG. 4.
Figure 6B:
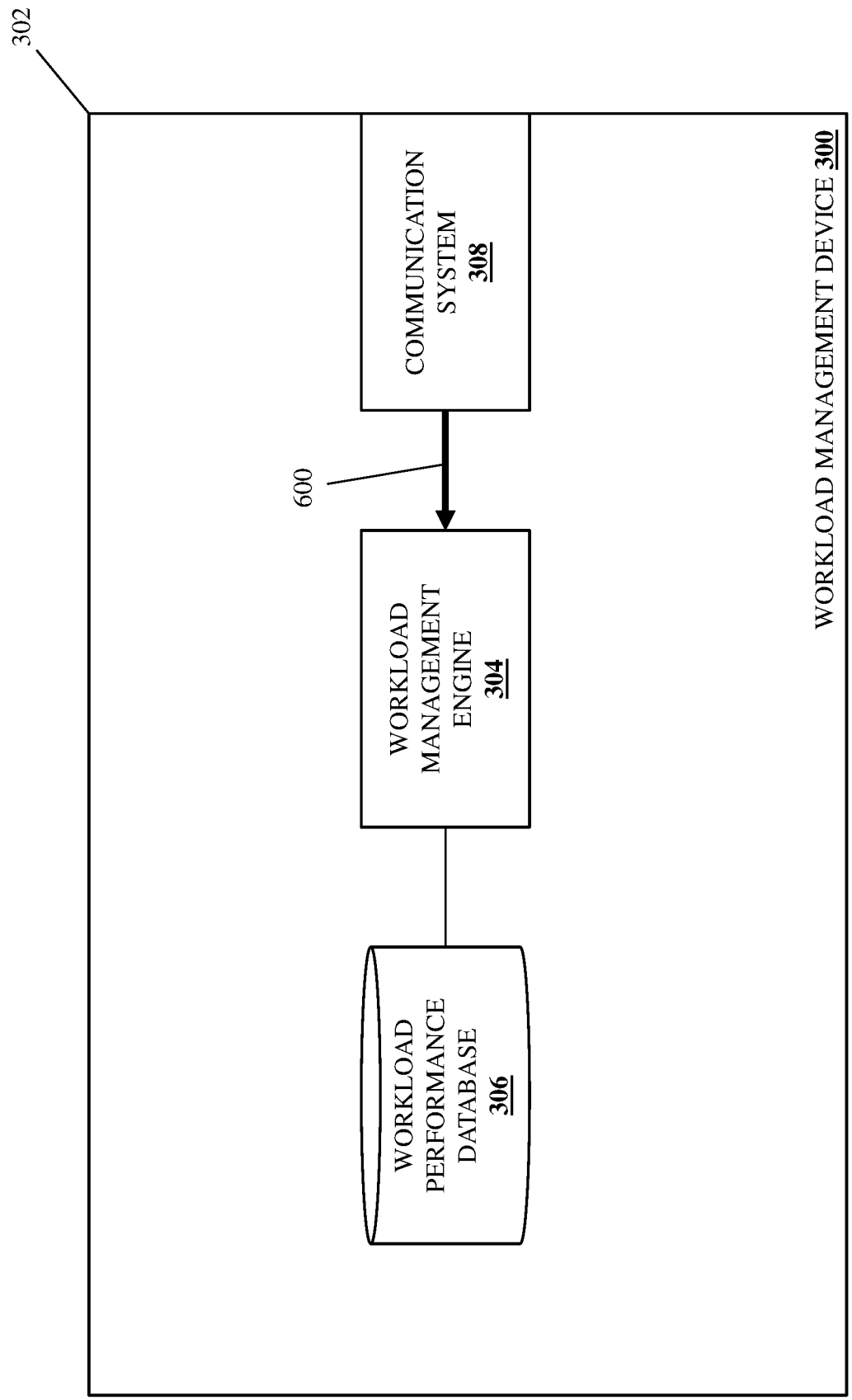
FIG. 6B is a schematic view illustrating an embodiment of the workload management device of FIG. 3 operating during the method of FIG. 4.

The method 400 then proceeds to block 404 where the workload management device receives a request to perform a workload including a plurality of sub-workloads. With reference to FIGS. 6A and 6B, in an embodiment of block 404, the workload provisioning device(s) 204 may perform workload performance request transmission operations 600 that may include transmitting a request to perform a workload to the workload management device 202/300 such that the workload deployment sub-engine in the workload management engine 304 receives that request via its communication system 308. As discussed above, the workload whose performance is requested at block 402 may require the performance of a plurality of sub-workloads or other workload operations. In some examples, each of the sub-workloads required to perform a workload may be identified in the request to perform the workload. In other examples, the workload deployment sub-engine in workload management engine 304 may be configured to identify each of the sub-workloads required to perform a workload in response to receiving the request to perform the workload. However, while a few specific examples have been provided, one of skill in the art in possession of the present disclosure will appreciate how sub-workloads for performing a workload may be identified in a variety of manners that will fall within the scope of the present disclosure as well.

Figure 7:
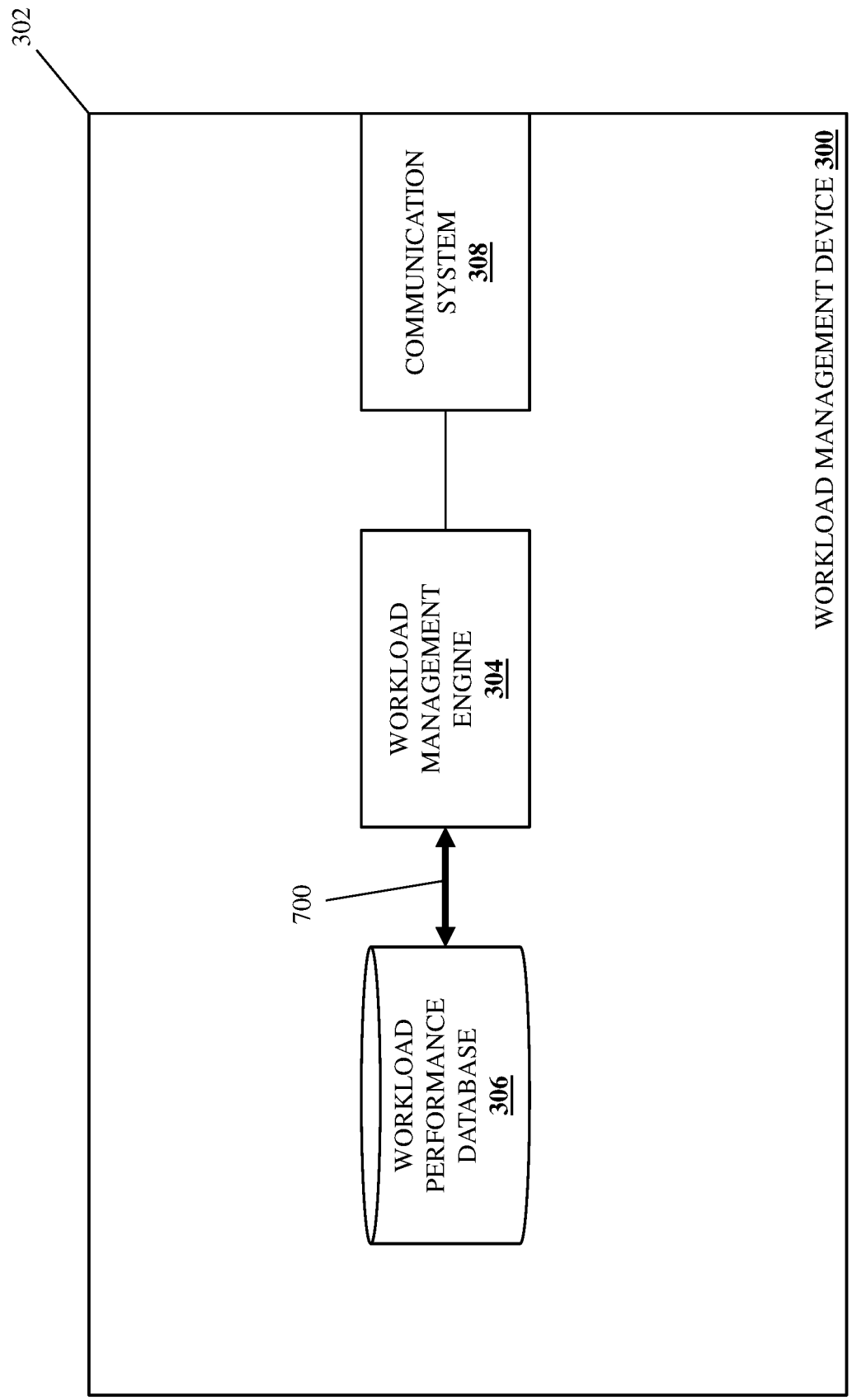
FIG. 7 is a schematic view illustrating an embodiment of the workload management device of FIG. 3 operating during the method of FIG. 4.

The method 400 then proceeds to block 406 where the workload management device identifies a respective processing system for performing each sub-workload. With reference to FIG. 7, in an embodiment of block 406, the workload deployment sub-engine in the workload management engine 304 in the workload management device 202/300 may request the allocation of resources by the resource allocation sub-engine in the workload management engine 304 in the workload management device 202/300, and the resource allocation sub-engine in the workload management engine 304 may perform resource identification operations 700 that include accessing the workload performance database 306 to identify a respective processing system for performing each sub-workload included in the workload requested at block 404. For example, at block 406, the resource allocation sub-engine in the workload management engine 304 may determine workload requirements for the workload requested at block 404 (and/or its sub-workloads). In a specific example, workload requirements may be defined by SLAs that identify how that workload and/or its sub-workloads should be performed (e.g., guaranteed/minimum performance levels for the workload and/or its sub-workloads, 'best effort' performance levels for the workload and/or its sub-workloads, etc.), and at block 406 the resource allocation sub-engine in the workload management engine 304 may identify processing systems in the knowledge base provided by the workload performance database 306 that have historically satisfied such workload requirements for sub-workloads and/or workloads. As such, following block 406, a processing system has been identified for performing each sub-workload in the workload requested at block 404.

The method 400 then proceeds to block 408 where the workload management device allocates a respective memory system for use by each processing system in performing each sub-workload. In an embodiment, at block 408, the resource identification operations 700 performed by the resource allocation sub-engine in the resource management engine 304 in the resource management device 202/300 may include identifying and allocating a respective memory system for use by each processing system that was identified at block 406 to perform a respective sub-workload in the workload requested at block 404, with that respective memory system identified in the knowledge base provided by the workload performance database 306 based on it historically satisfying the workload requirements for that respective sub-workload and/or workload. For example, the knowledge base provided by the workload performance database 306 may be configured to identify a memory tier of memory systems that may be optimized for the performance of a particular sub-workload by any particular processing systems, with memory systems selected from that memory tier for allocation to processing systems performing that sub-workload.

In particular, at block 408, memory systems in different memory tiers may be allocated for use by processing systems identified to perform the sub-workloads in the workload requested at block 404, with those memory systems in the different memory tiers selected to optimize at least one workload performance pipeline characteristic of a workload performance pipeline provided by the respective processing systems that will perform the plurality of sub-workloads. For example, each memory system allocated at block 408 for use by a respective processing system identified at block 406 may result in a respective processing systems/memory system combination that optimizes the performance of the respective sub-workload being performed by that processing system, and thus each memory system may be allocated at block 408 based on the knowledge base provided by the workload performance database 306 identifying that memory system as having historically provided optimal performance of that sub-workload by that processing system.

In another example, the memory systems allocated at block 408 for use by the respective processing systems identified at block 406 may result in a plurality of processing systems/memory system combinations that optimize the performance of the workload via the performance of the respective sub-workloads being performed by those processing systems, and thus the plurality of memory systems may be allocated at block 408 based on the knowledge base provided by the workload performance database 306 identifying those memory systems as having historically provided optimal performance of that workload via the performance of its sub-workloads by those processing systems. Furthermore, while two examples have been provided of 1) allocating memory systems for use by processing systems to optimize the individual performance of sub-workloads included in the workload, and 2) allocating memory systems for use by processing systems to optimize the performance of the workload provided by the plurality of sub-workloads, one of skill in the art in possession of the present disclosure will appreciate how different workload performance characteristics may be used (e.g., optimizing the performance of one or more individual sub-workloads included in a workload, and optimizing the performance of groups of sub-workloads in that workload) while remaining within the scope of the present disclosure as well.

In some examples, the optimization of the performance of an individual sub-workload may include identifying a processing system and allocating a memory system to that processing system to enable the fastest available data processing, which may include allocating the memory system from a highest memory tier. However, in other examples, the optimization of the performance of an individual sub-workload may include identifying a processing system and allocating a memory system to that processing system to satisfy a "best effort" SLA for the sub-workload, which may include allocating a memory system from an intermediate or lowest memory tier. As such, optimization of the performance of a sub-workload may include the optimization of workload performance, the optimization of efficiency, the optimization of resource use, and/or other optimizations that would be apparent to one of skill in the art in possession of the present disclosure. In other words, optimization of a sub-workload may optimize the use of resources to perform a sub-workload, and may include identifying a processing system and allocating a memory system that satisfy an SLA for that sub-workload without wasting resources of relatively higher performance processing systems and/or memory systems.

Similarly, in some examples, the optimization of the performance of a group of sub-workloads (and in some cases all sub-workloads) in a workload may include identifying processing systems and allocating respective memory systems to those processing systems to enable the fastest performance of the workload, which may include allocating memory systems from a highest memory tier. However, in other examples, the optimization of the performance of a group of sub-workloads (and in some cases all sub-workloads) in a workload may include identifying processing systems and allocating respective memory systems to those processing systems to satisfy a "best effort" SLA for the workload, which may include allocating memory systems from an intermediate or lowest memory tier.

Furthermore, in yet other examples, the optimization of the performance of a group of sub-workloads (and in some cases all sub-workloads) in a workload may include identifying one or more processing systems and allocating respective memory systems to those processing system(s) to address a bottleneck that would otherwise occur in the performance of the workload, which may include allocating memory systems from an intermediate or higher memory tier than would otherwise be required if only a corresponding individual sub-workload was optimized. As such, optimization of the performance of a group of sub-workloads (and in some cases all sub-workloads) in a workload may include the optimization of workload performance, the optimization of efficiency, the optimization of resource use, and/or other optimizations that would be apparent to one of skill in the art in possession of the present disclosure. In other words, optimization of a group of sub-workloads (and in some cases all sub-workloads) in a workload may optimize the use of resources to perform the workload, and may include identifying processing systems and allocating respective memory systems that satisfy an SLA for that workload without wasting resources of relatively higher performance processing systems and/or memory systems.

Figure 8A:
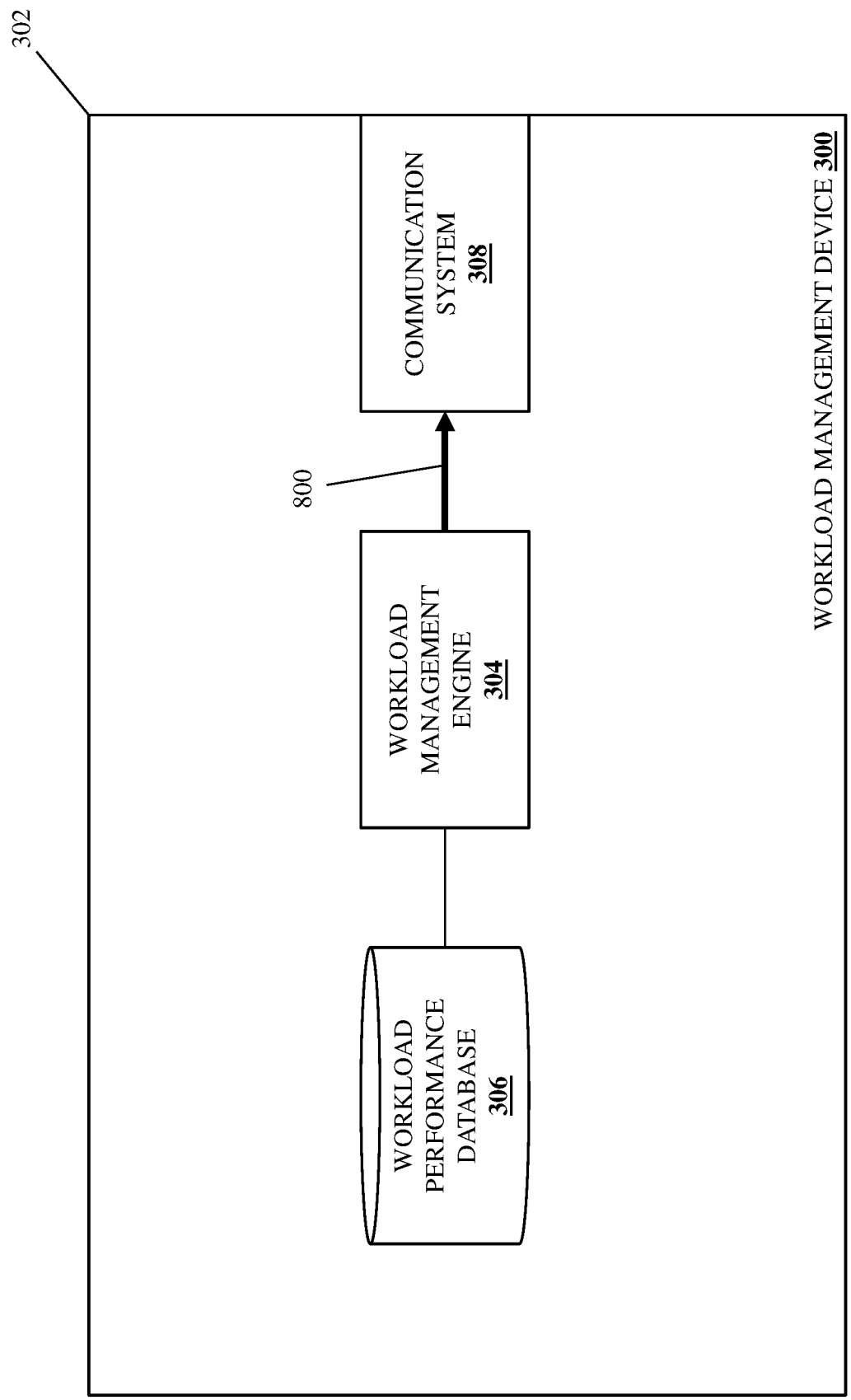
FIG. 8A is a schematic view illustrating an embodiment of the workload management device of FIG. 3 operating during the method of FIG. 4.

The method 400 then proceeds to block 410 where the workload management device configures respective processing system/memory system combinations to perform each sub-workload. With reference to FIGS. 8A and 8B, in an embodiment of block 410, the resource allocation sub-engine in the workload management engine 304 in the workload management device 202/300 may request resource configuration from the resource configuration sub-engine in the workload management engine 304 in the workload management device 202/300, and the resource configuration sub-engine in the workload management engine 304 may perform processing system/memory system configuration operations 800 that may include configuring the combinations of the processing systems 208 and memory systems 210, and in some cases the networking systems 206 that provide their connectivity, to perform each sub-workload included in the workload requested at block 404. Furthermore, in some embodiments, the function configuration operations 800 may include configuring the storage systems 212 for use in performing any of the sub-workloads included in the workload requested at block 404 as well (if needed).

In an embodiment of block 410, the resource configuration sub-engine in the workload management engine 304 in the resource management device 202/300 may map, for each sub-workload included in the workload requested at block 404, the respective memory system allocated for that sub-workload to the respective processing system identified for performing that sub-workload (e.g., by allocating a memory capacity of that memory system and mapping a corresponding memory region provided by that memory system to memory address space used by that processing system) in order to configure the connectivity between that processing system and memory system determined for that sub-workload. As discussed above, in addition to identifying memory systems/memory tiers optimized for the performance of sub-workloads by processing systems, the workload performance database 306 may identify memory capacity, memory functionality, and/or other memory characteristics that provide for the optimized performance of sub-workloads using those memory systems, and thus the resource configuration sub-engine in the workload management engine 304 may retrieve those memory characteristics and use them to configure the memory systems at block 410 as well.

As such, one of skill in the art in possession of the present disclosure will appreciate how the workload management engine 304 in the workload management device 202/300 may generate a workload performance pipeline provided by processing systems utilizing respective memory systems that optimize at least one workload performance pipeline characteristic of the workload performance pipeline provided by the processing systems. Following the configuration of the processing system/memory system combinations, the workload deployment sub-engine in the workload management engine 304 in the workload management device 202/300 may deploy the workload such that those processing system/memory system combinations may perform each of the sub-workloads included in the workload requested at block 404.

Figure 9A:
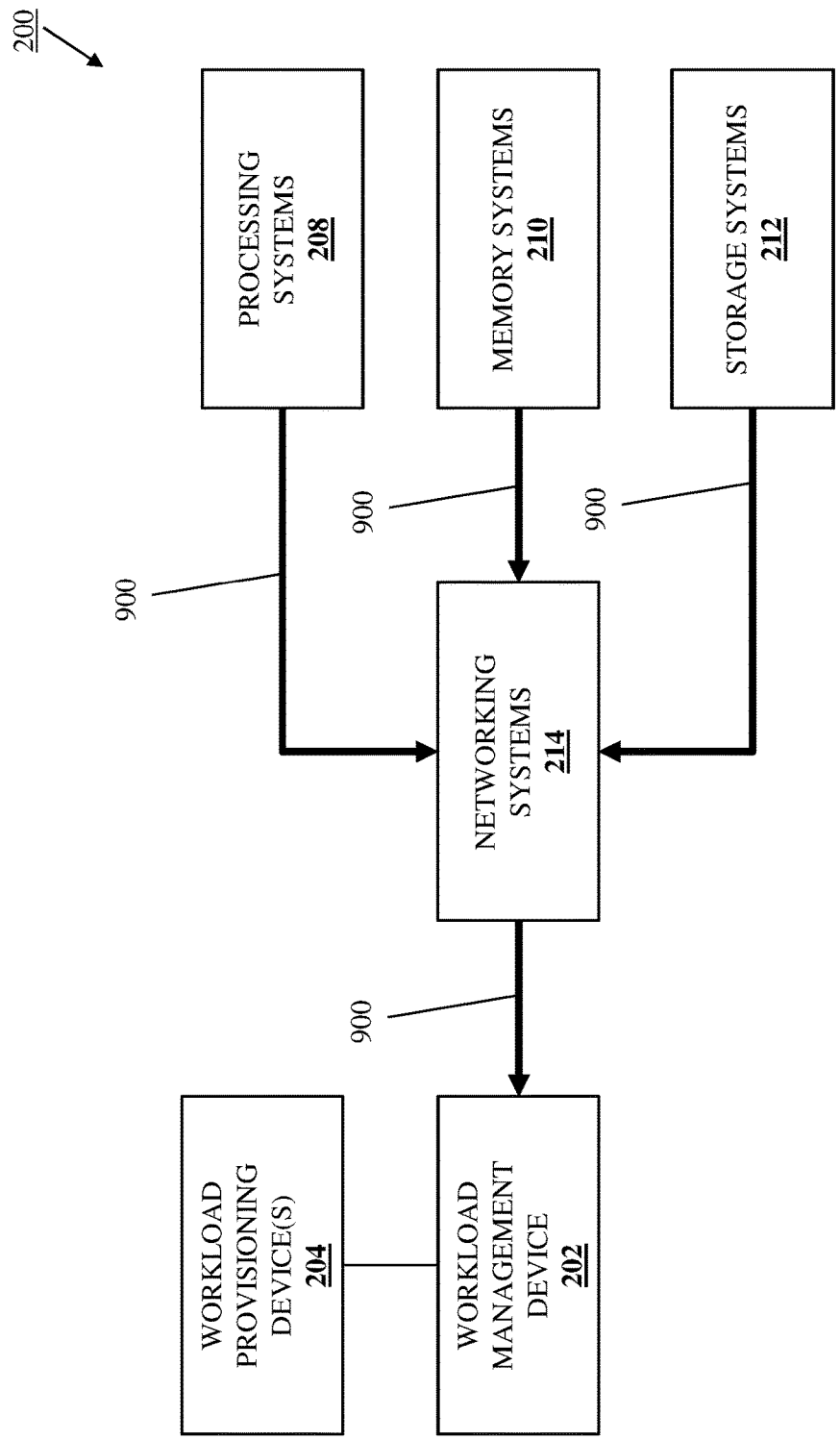
FIG. 9A is a schematic view illustrating an embodiment of the tiered memory fabric workload performance optimization system of FIG. 2 operating during the method of FIG. 4.
Figure 9B:
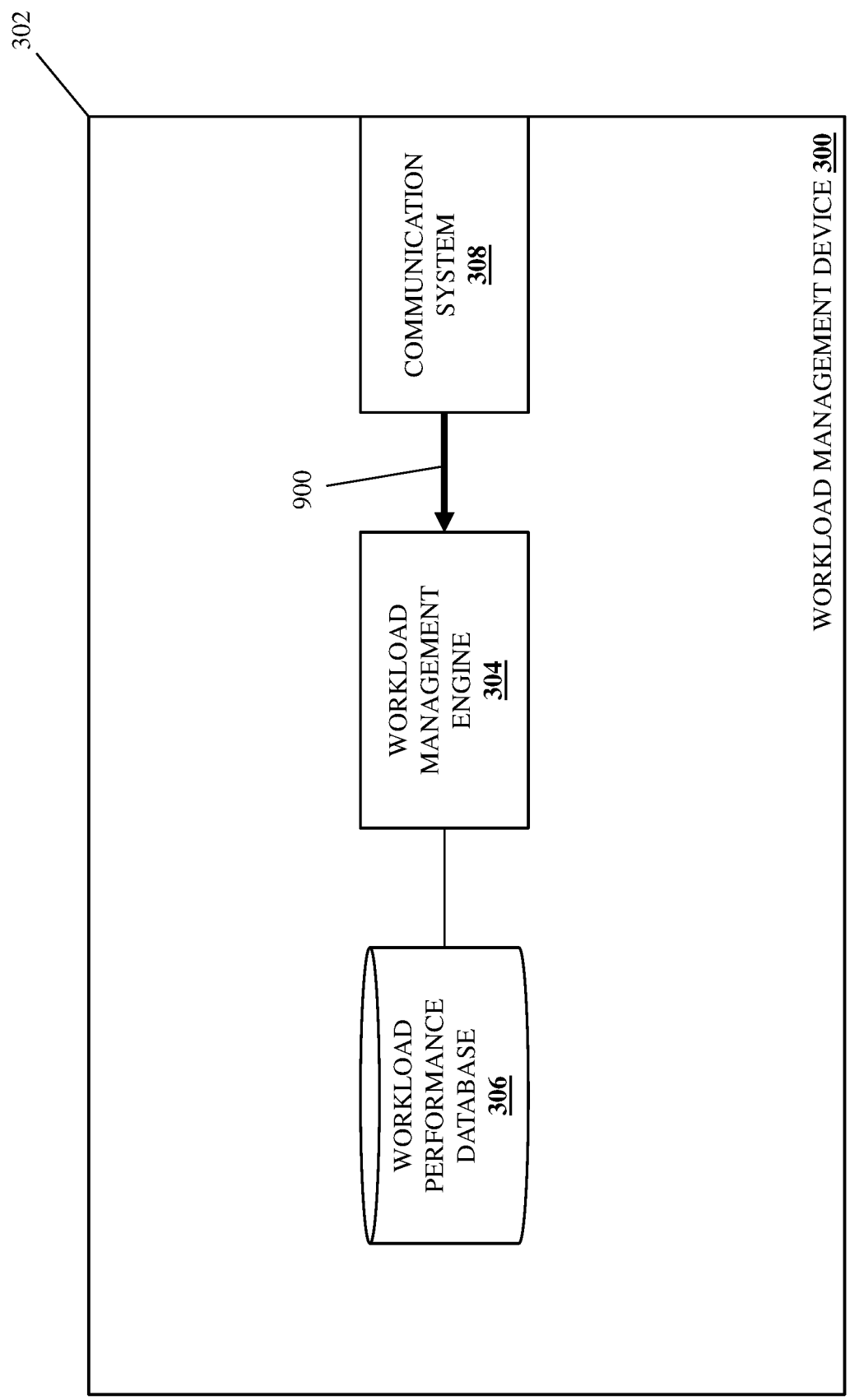
FIG. 9B is a schematic view illustrating an embodiment of the workload management device of FIG. 3 operating during the method of FIG. 4.

The method 400 then proceeds to decision block 412 where it is determined whether workload performance pipeline optimizations have been identified. With reference to FIGS. 9A and 9B, in an embodiment of decision block 412 and during the performance of the sub-workloads included in the workload requested at block 404 by processing system/memory system combinations configured to perform those sub-workloads as discussed above, the resource monitoring sub-engine in the workload management engine 304 in the workload management device 202/300 may perform workload performance monitoring operations 900 that may include monitoring the performance of the sub-workloads by the processing system/memory system combinations configured to perform those sub-workloads (by monitoring the resource utilization of those processing systems and memory systems). As will be appreciated by one of skill in the art in possession of the present disclosure, the monitoring at decision block 412 may be used to identify patterns in the performance of the sub-workloads by the processing system/memory system combinations configured to perform those sub-workloads, which may include identifying data migrations, data usage patterns, data "gravity" points, resource constraints, bottlenecks, and/or any other performance metrics associated with the performance of the sub-workloads by the processing system/memory system combinations configured to perform those sub-workloads.

Figure 10:
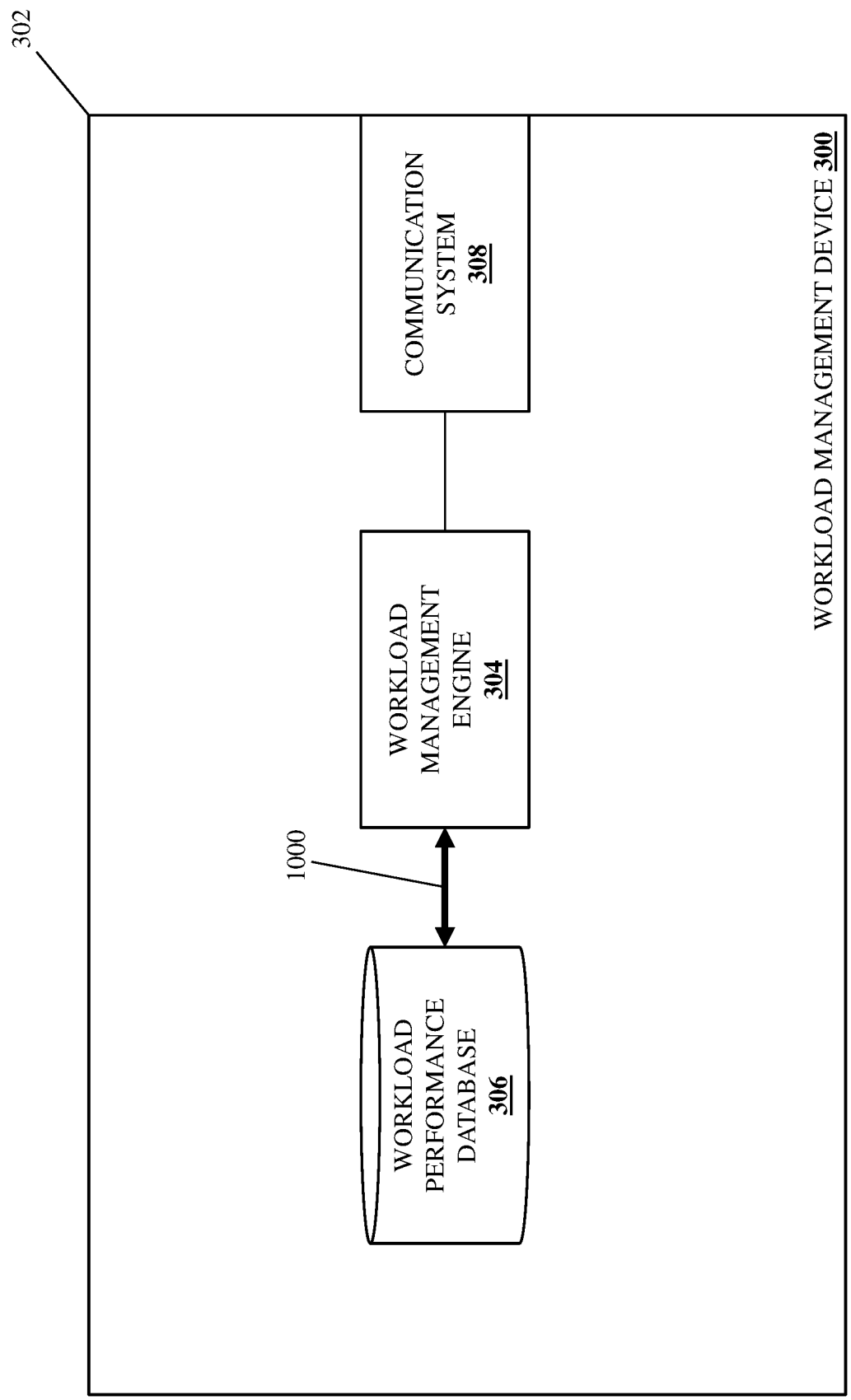
FIG. 10 is a schematic view illustrating an embodiment of the workload management device of FIG. 3 operating during the method of FIG. 4.

With reference to FIG. 10, in an embodiment of decision block 412 and in response to the monitoring, the resource monitoring sub-engine in the workload management engine 304 in the workload management device 202/300 may perform workload performance pipeline modification determination operations that may include determining one or more workload performance pipeline modifications for addressing any issues that may be identified during the monitoring at decision block 412, which may include adjustments to the processing systems and/or memory systems performing the sub-workloads in order to address and/or to optimize the identified data migrations, optimize the identified data usage patterns, address the identified data "gravity" points, remedy the identified resource constraints, remedy the identified bottlenecks, and/or address any of the other issues identified with the performance of the workload during the monitoring of that workload.

For example, the workload performance pipeline modification determination at decision block 412 may include determining that the performance of the workload by the processing system/memory system combinations does not satisfy a workload performance threshold of the workload requested at block 404, and then determining processing system and/or memory system modification(s) for at least one of the sub-workloads in the workload that causes the performance of the workload by the processing system/memory system combinations to satisfy the workload performance threshold. To provide a specific example, the modification determination may include identifying a sub-workload that provides a bottleneck in the workload, and then replacing the memory system utilized to perform that sub-workload with a memory system in a higher memory tier (or otherwise providing a memory system with a higher memory capacity, a higher memory bandwidth, a lower memory latency, etc.) that, when used to perform that sub-workload, will eliminate the bottleneck.

In another example, the workload performance pipeline modification determination at decision block 412 may include determining that the performance of the workload by the processing system/memory system combinations exceeds a workload performance threshold of the workload requested at block 404 by an resource utilization efficiency threshold, and then determining processing system and/or memory system modification(s) for at least one of the sub-workloads in the workload that causes the performance of the workload by the processing system/memory system combinations to satisfy the workload performance threshold without exceeding the resource utilization efficiency threshold. To provide a specific example, the modification determination may include identifying that processing system/memory system combinations are exceeding resource utilization efficiency thresholds in performing a workload, and then replacing one or more memory systems utilized to perform sub-workload(s) in that workload with memory system(s) in a lower memory tier (or otherwise providing a memory system with a lower memory capacity, a lower memory bandwidth, a higher memory latency, etc.) that, when used to perform that sub-workload, will allow the workload performance threshold to be satisfied without exceeding the resource utilization efficiency threshold. However, while a few specific examples have been described, one of skill in the art in possession of the present disclosure will appreciate how workload performance may be monitored in a variety of manners to allow for the intelligent adjustment of processing system/memory systems allocations described herein.

If, at decision block 412, it is determined that no workload performance pipeline optimizations have been identified, the method 400 returns to block 402. As such, the method 400 may loop such that the workload management device monitors workload performance, receives requests to perform workloads, identifies processing systems for performing sub-workloads in those workloads, allocated memory systems for use by those processing systems in performing those sub-workloads, and configures those processing system/memory system combinations to perform those sub-workloads, as long as no workload performance pipeline optimization(s) have been identified. As such, as long as the processing system/memory systems combinations configured to perform sub-workloads in a workload perform those sub-workloads/workloads to optimize one or more workload performance pipeline characteristic, those processing system/memory systems combinations will be used to complete the performance of those workloads.

Figure 11A:
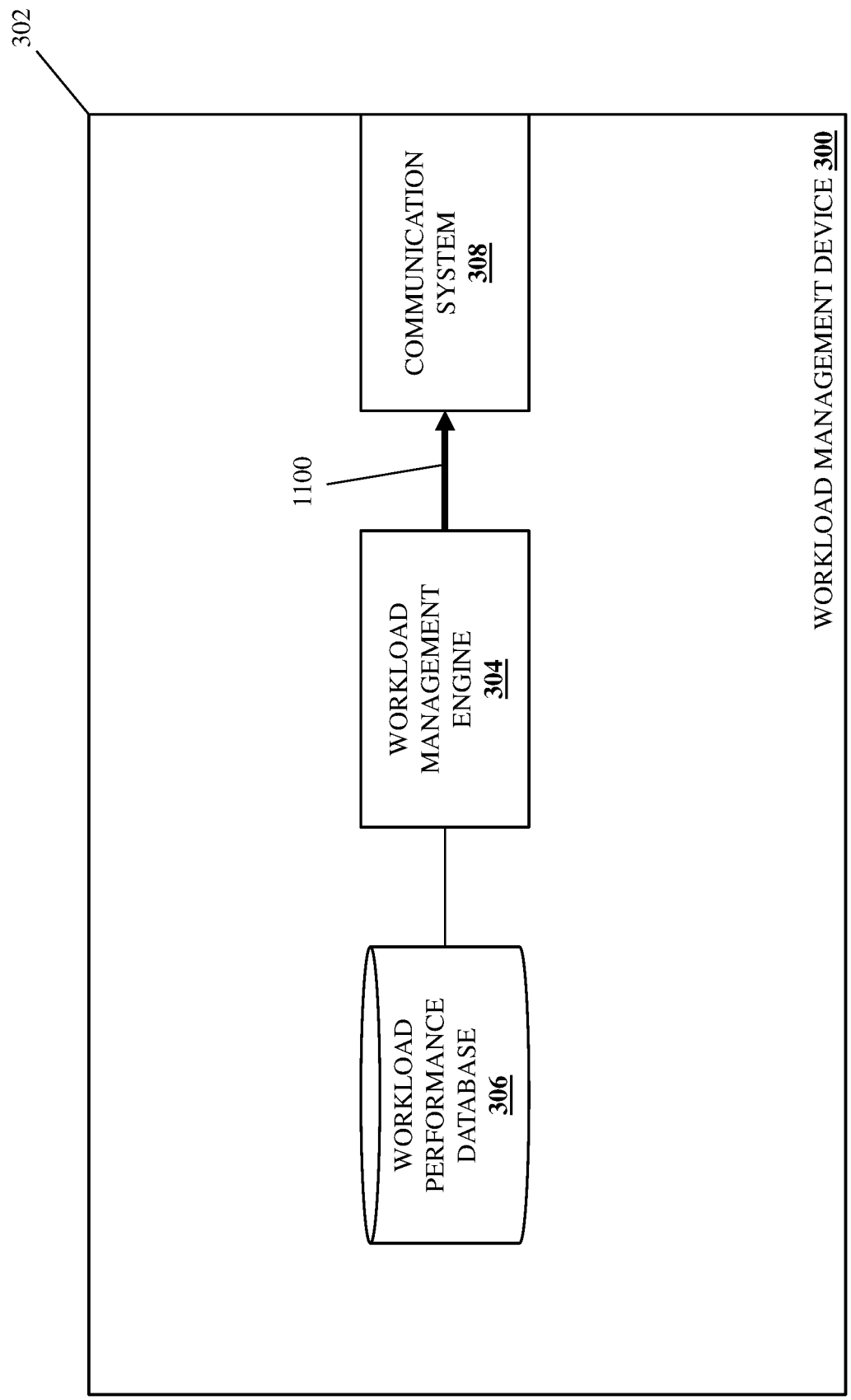
FIG. 11A is a schematic view illustrating an embodiment of the workload management device of FIG. 3 operating during the method of FIG. 4.
Figure 11B:
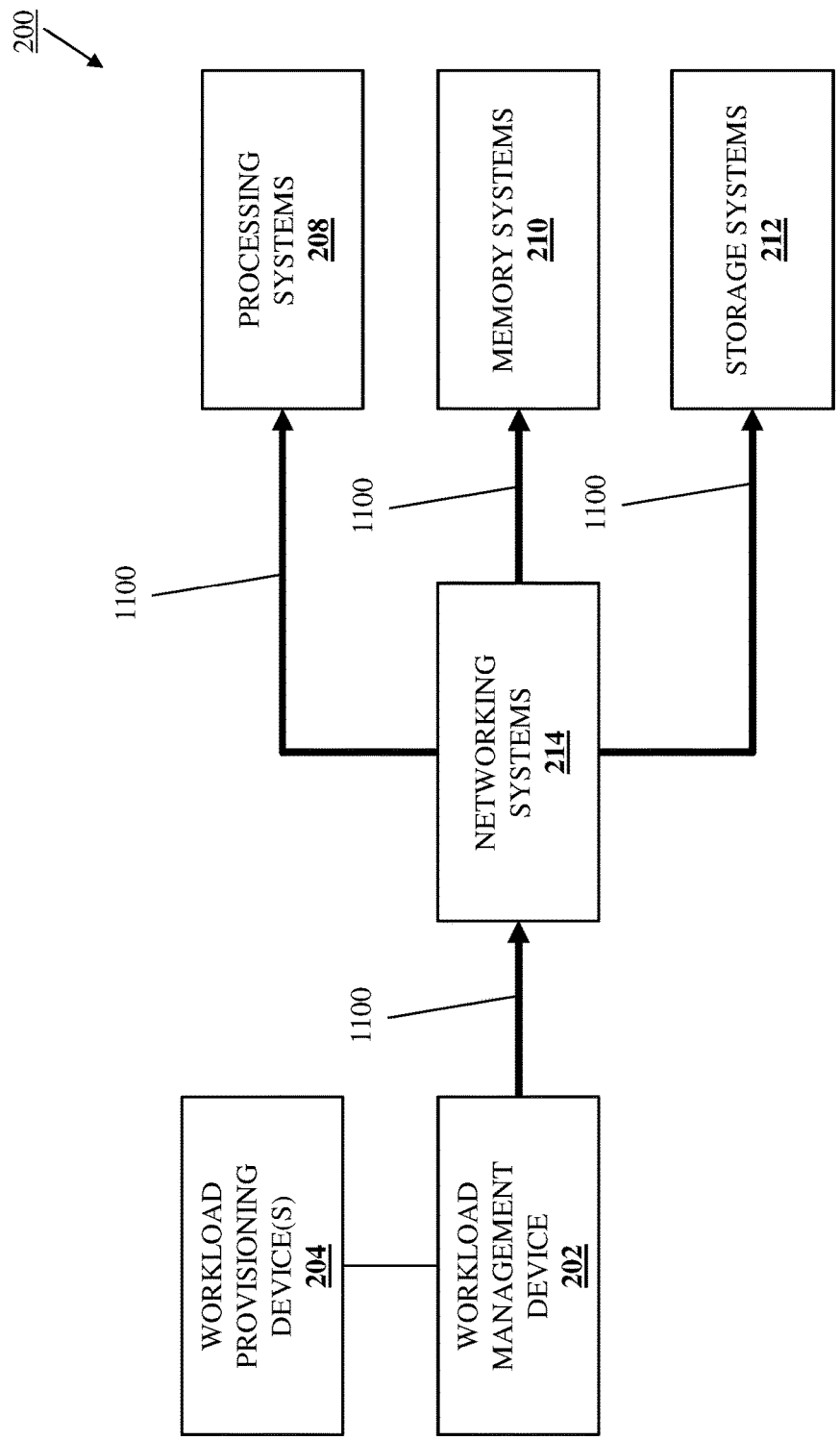
FIG. 11B is a schematic view illustrating an embodiment of the tiered memory fabric workload performance optimization system of FIG. 2 operating during the method of FIG. 4.

If at decision block 412, it is determined that workload performance pipeline optimizations have been identified, the method 400 proceeds to block 414 where the workload management device modifies respective memory systems allocation(s) for one or more of the processing systems in performing respective sub-workload(s). With reference to FIGS. 11A and 11B, in an embodiment of block 414 and in response to determining workload performance pipeline modification(s) have been identified at decision block 412, the resource management engine 304 in the resource management device 202/300 may perform workload performance pipeline modification operations 1100 that, in the illustrated example, may include modifying any of the processing systems 208 and/or the memory systems 210 in the processing system/memory system combinations that are being used to perform the sub-workloads in the workload requested at block 404. Furthermore, while not described herein in detail, the workload performance pipeline modification operations 1100 may include modifying any of the storage systems 212 that are being used to perform the sub-workloads in the workload requested at block 404 as well.

As such, continuing with one of the specific example provided above, the workload performance pipeline modification operations 1100 may include replacing a memory system utilized to perform a sub-workload that was providing a bottleneck in its workload with a memory system in a higher memory tier that, when used to perform that sub-workload, will eliminate the bottleneck. Similarly, continuing with another of the specific examples provided above, the workload performance pipeline modification operations 1100 may include replacing one or more memory systems utilized to perform sub-workload(s) in a workload in which a resource utilization efficiency threshold is being exceeded with memory system(s) in a lower memory tier that, when used to perform that sub-workload, will allow the workload performance threshold to be satisfied without exceeding the resource utilization efficiency threshold.

The method 400 then returns to block 402. As will be appreciated by one of skill in the art in possession of the present disclosure, at the completion of the performance of the workload by the processing systems/memory system combinations, those processing systems and memory systems may be de-allocated form each other and the workload such that they are available for use to perform other workloads. As such, the performance of workloads using a tiered memory fabric is optimized via the allocation of memory systems in different memory tiers to processing systems in a manner that optimizes the workload performance pipeline provided by those processing systems.

Thus, systems and methods have been described that allocate a plurality of memory systems in different memory tiers of a distributed tiered memory fabric for use by respective processing systems in performing workloads in a manner that optimizes a workload performance pipeline provided by those processing systems. For example, the tiered memory fabric workload performance optimization system may include a workload management device coupled to a processing fabric and a memory fabric. The workload management system receives a workload request to perform a workload including sub-workloads, and identifies a respective processing system in the processing fabric for performing each of the sub-workloads. The workload management device then determines, for use by each respective processing system identified for performing the sub-workloads, a respective memory system in the memory fabric to provide memory systems in different memory tiers in the memory fabric that optimize characteristic(s) of a workload performance pipeline provided by the respective processing systems identified for performing the sub-workloads. The workload management device then configures each respective processing system identified for performing each of the sub-workloads, and the respective first memory system determined for that respective processing system, to perform the sub-workload that respective processing system was identified to perform. As such, the performance of workloads is improved relative to conventional workload performance systems.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A tiered memory fabric workload performance optimization system, comprising:
 a processing fabric;
 a memory fabric; and
 a workload management device that is coupled to the processing fabric and the memory fabric, wherein the workload management system is configured to:
  receive a workload request to perform a workload including a plurality of sub-workloads;
  identify a respective processing system in the processing fabric for performing each of the plurality of sub-workloads;
  determine, for use by each respective processing system identified for performing each of the plurality of sub-workloads, a respective first memory system in the memory fabric to provide a plurality of respective first memory systems in different memory tiers in the memory fabric that optimize at least one first workload performance pipeline characteristic of a workload performance pipeline provided by the respective processing systems identified for performing the plurality of sub-workloads; and
  configure each respective processing system identified for performing each of the plurality of sub-workloads, and the respective first memory system determined for that respective processing system, to perform the sub-workload that respective processing system was identified to perform.

2. The system of claim 1, wherein the workload management system is configured to:
   monitor the performance of each of the plurality of sub-workloads; and
   determine, for a first processing system using a first memory system in a first memory tier to perform a first sub-workload included in the plurality of sub-workloads, a second memory system in a second memory tier in the memory fabric to replace the first memory system and optimize at least one second workload performance pipeline characteristic of the workload performance pipeline provided by the respective processing systems identified for performing the plurality of sub-workloads.

3. The system of claim 2, wherein the second memory tier of the second memory system in is a higher speed memory tier than the first memory tier of the first memory system and the replacement of the first memory system with the second memory system addresses a data transmission bottleneck in the workload performance pipeline.

4. The system of claim 1, wherein the workload management system is configured to:
   monitor the performance of each of the plurality of sub-workloads;
   determine, for a first processing system using a first memory system to perform a first sub-workload included in the plurality of sub-workloads, a memory system reconfiguration for the first memory system that optimizes at least one second workload performance pipeline characteristic of the workload performance pipeline provided by the respective processing systems identified for performing the plurality of sub-workloads; and
   perform the memory system reconfiguration on the first memory system.

5. The system of claim 1, wherein the identifying of the respective processing system for performing each of the plurality of sub-workloads and the determining of the respective first memory system for use by each respective processing system identified for performing each of the plurality of sub-workloads is performed using historical processing system/memory system workload performance data.

6. The system of claim 5, wherein the workload management system is configured to:
   monitor the performance of each of the plurality of sub-workloads; and
   modify, based on the performance of each of the plurality of sub-workloads, the historical processing system/memory system workload performance data.

7. An Information Handling System (IHS), comprising:
   a workload management processing system; and
   a workload management memory system that is coupled to the workload management processing system and that includes instructions that, when executed by the workload management processing system, cause the workload management processing system to provide a workload management engine that is configured to:
   receive a workload request to perform a workload including a plurality of sub-workloads;
   identify a respective fabric processing system in a processing fabric for performing each of the plurality of sub-workloads;
   determine, for use by each respective fabric processing system identified for performing each of the plurality of sub-workloads, a respective first fabric memory system in a memory fabric to provide a plurality of respective first fabric memory systems in different memory tiers in the memory fabric that optimize at least one first workload performance pipeline characteristic of a workload performance pipeline provided by the respective fabric processing systems identified for performing the plurality of sub-workloads; and
   configure each respective fabric processing system identified for performing each of the plurality of sub-workloads, and the respective first fabric memory system determined for that respective fabric processing system, to perform the sub-workload that respective fabric processing system was identified to perform.

8. The IHS of claim 7, wherein the workload management engine is configured to:
   monitor the performance of each of the plurality of sub-workloads; and
   determine, for a first fabric processing system using a first fabric memory system in a first memory tier to perform a first sub-workload included in the plurality of sub-workloads, a second fabric memory system in a second memory tier in the memory fabric to replace the first fabric memory system and optimize at least one second workload performance pipeline characteristic of the workload performance pipeline provided by the respective fabric processing systems identified for performing the plurality of sub-workloads.

9. The IHS of claim 8, wherein the second memory tier of the second fabric memory system in is a higher speed memory tier than the first memory tier of the first fabric memory system and the replacement of the first fabric memory system with the second fabric memory system addresses a data transmission bottleneck in the workload performance pipeline.

10. The IHS of claim 7, wherein the workload management engine is configured to:
    monitor the performance of each of the plurality of sub-workloads;
    determine, for a first fabric processing system using a first fabric memory system to perform a first sub-workload included in the plurality of sub-workloads, a memory system reconfiguration for the first fabric memory system that optimizes at least one second workload performance pipeline characteristic of the workload performance pipeline provided by the respective fabric processing systems identified for performing the plurality of sub-workloads; and
    perform the memory system reconfiguration on the first fabric memory system.

11. The IHS of claim 7, wherein the identifying of the respective fabric processing system for performing each of the plurality of sub-workloads and the determining of the respective first fabric memory system for use by each respective fabric processing system identified for performing each of the plurality of sub-workloads is performed using historical fabric processing system/fabric memory system workload performance data.

12. The IHS of claim 11, wherein the workload management engine is configured to:
    monitor the performance of each of the plurality of sub-workloads; and modify, based on the performance of each of the plurality of sub-workloads, the historical fabric processing system/fabric memory system workload performance data.

13. The IHS of claim 7, wherein the memory tier of at least one of the respective first fabric memory systems is associated with memory system characteristics that correspond to a minimum performance threshold for the sub-workload performed by the respective fabric processing system for which that respective first fabric memory system is determined.

14. A method for optimizing the performance of workloads using a tiered memory fabric, comprising:
receiving, by a workload management device, a workload request to perform a workload including a plurality of sub-workloads;
identifying, by the workload management device, a respective processing system in a processing fabric for performing each of the plurality of sub-workloads;
determining, by the workload management device for use by each respective processing system identified for performing each of the plurality of sub-workloads, a respective first memory system in a memory fabric to provide a plurality of respective first memory systems in different memory tiers in the memory fabric that optimize at least one first workload performance pipeline characteristic of a workload performance pipeline provided by the respective processing systems identified for performing the plurality of sub-workloads; and
configuring, by the workload management device, each respective processing system identified for performing each of the plurality of sub-workloads, and the respective first memory system determined for that respective processing system, to perform the sub-workload that respective processing system was identified to perform.

15. The method of claim 14, further comprising:
monitoring, by the workload management device, the performance of each of the plurality of sub-workloads; and
determining, by the workload management device, for a first processing system using a first memory system in a first memory tier to perform a first sub-workload included in the plurality of sub-workloads, a second memory system in a second memory tier in the memory fabric to replace the first memory system and optimize at least one second workload performance pipeline characteristic of the workload performance pipeline provided by the respective processing systems identified for performing the plurality of sub-workloads.

16. The method of claim 15, wherein the second memory tier of the second memory system in is a higher speed memory tier than the first memory tier of the first memory system and the replacement of the first memory system with the second memory system addresses a data transmission bottleneck in the workload performance pipeline.

17. The method of claim 14, further comprising:
monitoring, by the workload management device, the performance of each of the plurality of sub-workloads;
determining, by the workload management device for a first processing system using a first memory system to perform a first sub-workload included in the plurality of sub-workloads, a memory system reconfiguration for the first memory system that optimizes at least one second workload performance pipeline characteristic of the workload performance pipeline provided by the respective processing systems identified for performing the plurality of sub-workloads; and
performing, by the workload management device, the memory system reconfiguration on the first memory system.

18. The method of claim 14, wherein the identifying of the respective processing system for performing each of the plurality of sub-workloads and the determining of the respective first memory system for use by each respective processing system identified for performing each of the plurality of sub-workloads is performed using historical processing system/memory system workload performance data.

19. The method of claim 18, further comprising:
monitoring, by the workload management device, the performance of each of the plurality of sub-workloads; and
modifying, by the workload management device based on the performance of each of the plurality of sub-workloads, the historical processing system/memory system workload performance data.

20. The method of claim 14, wherein the memory tier of at least one of the respective first memory systems is associated with memory system characteristics that correspond to a minimum performance threshold for the sub-workload performed by the respective processing system for which that respective first memory system is determined.

* * * * *